(12) United States Patent
Liu et al.

(10) Patent No.: US 10,723,947 B2
(45) Date of Patent: *Jul. 28, 2020

(54) LIQUID CRYSTAL COMPOSITION AND LIQUID CRYSTAL DISPLAY DEVICE THEREOF

(71) Applicant: JIANGSU HECHENG DISPLAY TECHNOLOGY CO., LTD., Jiangsu (CN)

(72) Inventors: Yunyun Liu, Jiangsu (CN); Wenming Han, Jiangsu (CN); Wenquan Ding, Jiangsu (CN); Pengfei Li, Jiangsu (CN); Haibin Xu, Jiangsu (CN); Lifang Yao, Jiangsu (CN); Di He, Jiangsu (CN); Wenyang Ma, Jiangsu (CN); Heming Zhang, Jiangsu (CN); Junqiang Zhang, Jiangsu (CN)

(73) Assignee: JIANGSU HECHENG DISPLAY TECHNOLOGY CO., LTD., Jiangsu (CN)

( * ) Notice: Subject to any disclaimer, the term of this patent is extended or adjusted under 35 U.S.C. 154(b) by 81 days.

This patent is subject to a terminal disclaimer.

(21) Appl. No.: 15/568,486

(22) PCT Filed: Apr. 21, 2016

(86) PCT No.: PCT/CN2016/079938
§ 371 (c)(1),
(2) Date: Oct. 23, 2017

(87) PCT Pub. No.: WO2016/169497
PCT Pub. Date: Oct. 27, 2016

(65) Prior Publication Data
US 2018/0105747 A1 Apr. 19, 2018

(30) Foreign Application Priority Data

Apr. 23, 2015 (CN) .......................... 2015 1 0197148

(51) Int. Cl.
*G02F 1/13* (2006.01)
*C09K 19/12* (2006.01)
(Continued)

(52) U.S. Cl.
CPC .............. *C09K 19/12* (2013.01); *C09K 19/20* (2013.01); *C09K 19/3066* (2013.01);
(Continued)

(58) Field of Classification Search
CPC .... C09K 19/12; C09K 19/20; C09K 19/3066; C09K 19/32; C09K 19/3405; C09K 19/42;
(Continued)

(56) References Cited

U.S. PATENT DOCUMENTS

| 7,709,066 | B2 * | 5/2010 | Matsumura | ............ | C09K 19/12 |
| | | | | | 252/299.61 |
| 2018/0037818 | A1 * | 2/2018 | Dai | ........................ | C09K 19/12 |

(Continued)

FOREIGN PATENT DOCUMENTS

| CN | 101652453 | 2/2010 |
| CN | 102307968 | 1/2012 |

(Continued)

OTHER PUBLICATIONS

"International Search Report (Form PCT/ISA/210)", dated Jul. 18, 2016, with English translation thereof, pp. 1-6.

*Primary Examiner* — Geraldina Visconti
(74) *Attorney, Agent, or Firm* — JCIPRNET

(57) ABSTRACT

Provided is a liquid crystal composition, comprising: one or more compounds of general formula I accounting for 1-30% of the total weight of the liquid crystal composition; one or more compounds of general formula II accounting for 1-30% of the total weight of the liquid crystal composition; one or more compounds of general formula III accounting for 1-20% of the total weight of the liquid crystal composition; and one or more compounds of general formula IV accounting for 30-80% of the total weight of the liquid crystal composition. The liquid crystal composition has at least one of the following properties: a large specific resistance, a high voltage holding ratio, a suitable optical anisotropy, a large dielectric anisotropy, a small viscosity, a low threshold voltage, etc., and is also green and environmentally friendly. The liquid crystal composition is suitable for use in a liquid crystal display device, enabling the liquid crystal display device to have the following properties: a high voltage holding ratio, a short response time, a high contrast ratio, a low energy consumption, and being green and environmentally friendly, etc.

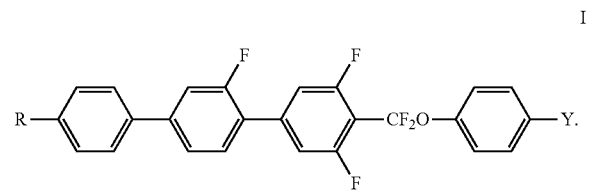

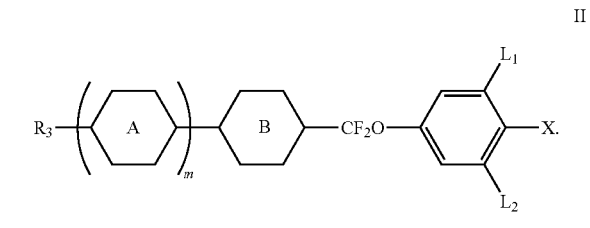

(Continued)

-continued

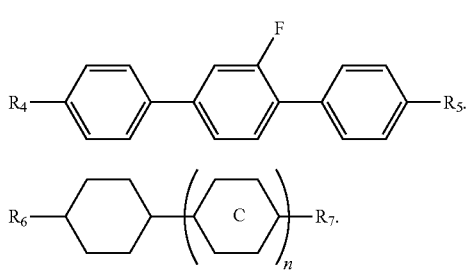

20 Claims, No Drawings

(51) Int. Cl.
| | |
|---|---|
| C09K 19/20 | (2006.01) |
| C09K 19/44 | (2006.01) |
| C09K 19/42 | (2006.01) |
| C09K 19/30 | (2006.01) |
| G02F 1/1333 | (2006.01) |
| C09K 19/32 | (2006.01) |
| C09K 19/34 | (2006.01) |
| C09K 19/04 | (2006.01) |

(52) U.S. Cl.
CPC .......... *C09K 19/32* (2013.01); *C09K 19/3405* (2013.01); *C09K 19/42* (2013.01); *C09K 19/44* (2013.01); *G02F 1/1333* (2013.01); C09K 2019/0466 (2013.01); C09K 2019/123 (2013.01); C09K 2019/301 (2013.01); C09K 2019/3004 (2013.01); C09K 2019/3016 (2013.01); C09K 2019/3422 (2013.01)

(58) Field of Classification Search
CPC ................ C09K 19/44; C09K 19/3402; C09K 2019/0466; C09K 2019/3004; C09K 2019/301; C09K 2019/3016; C09K 2019/3422; G02F 1/1333; G02F 1/13
USPC .................................................. 252/299.66
See application file for complete search history.

(56) References Cited

U.S. PATENT DOCUMENTS

| | | | |
|---|---|---|---|
| 2018/0119011 A1* | 5/2018 | Ma | C09K 19/12 |
| 2018/0142154 A1* | 5/2018 | Han | C09K 19/44 |

FOREIGN PATENT DOCUMENTS

| | | |
|---|---|---|
| CN | 102858918 | 1/2013 |
| CN | 104531169 | 4/2015 |
| CN | 105482828 | 4/2016 |
| CN | 105505403 | 4/2016 |
| WO | 2014141365 | 9/2014 |
| WO | 2015001821 | 1/2015 |

* cited by examiner

LIQUID CRYSTAL COMPOSITION AND LIQUID CRYSTAL DISPLAY DEVICE THEREOF

CROSS-REFERENCE TO RELATED APPLICATION

This application is a 371 of international application of PCT application serial no. PCT/CN2016/079938, filed on Apr. 21, 2016, which claims the priority benefit of China application no. 201510197148.3, filed on Apr. 23, 2015. The entirety of each of the above-mentioned patent applications is hereby incorporated by reference herein and made a part of this specification.

TECHNICAL FIELD

The present invention relates to a liquid crystal (LC) composition and a liquid crystal display device containing the liquid crystal composition, and particularly, relates to a liquid crystal display device employing active matrix (AM) and driven by thin film transistors (TFT).

BACKGROUND

The liquid crystal display devices are used in both direct view display and projection display for numerous information display purposes.

Generally, the display modes include, among others, phase change (PC), twist nematic (TN), super twisted nematic (STN), electrically controlled birefringence (ECB), optically compensated bend (OCB), in-plane switching (IPS), and vertical alignment (VA).

The devices operating in TN and STN modes employ positive dielectric anisotropy liquid crystal, the devices operating in ECB and VA modes employ negative dielectric anisotropy liquid crystal, while those operating in IPS mode may employ both positive and negative dielectric anisotropy liquid crystals.

The display devices may be categorized into passive matrix (PM) and active matrix (AM) according to the driving mode. The latter utilizes thin film transistor (TFT), metal insulator metal (MIM), etc.

Recently, the liquid crystal displays with features such as versatility, large screen, high definition and fast response are more and more popular. Such displays have to be driven in active matrix mode, in which TFTs are used mostly. In an AM-TFT device, the liquid crystal material, as the medium, and the liquid crystal cell constitute a capacitor. But in practice, the capacitor can't hold the voltage till the next refresh frame. To address this, each pixel is provided with a field effect transistor (FET). The pixel electrode is being charged when the TFT is on, while the capacitor is being charged when the TFT is off, until at next cycle the pixel is addressed again. The electric discharge rate of the pixel depends on the capacity of the electrodes and the specific resistance of the dielectric material therebetween. Therefore, a liquid crystal material with high specific resistance and suitable dielectric constant is desirable.

Being provided with a liquid crystal material with high specific resistance, the liquid crystal display device may have increased voltage holding ratio, and as a result, increased contrast ratio. Therefore, it's desirable for the liquid crystal material to have large specific resistance initially and retain a reasonable resistance after prolonged usage.

Being provided with a liquid crystal material with suitable optical anisotropy, the liquid crystal display device may have increased contrast ratio.

Being provided with a liquid crystal material with small viscosity, the liquid crystal display device may have short response time. With a short response time, the liquid crystal display device is suitable for displaying animations. Furthermore, a small viscosity is conducive to the injection of the liquid crystal material into the liquid crystal cell, thereby shortening the injection duration and further improving the operability.

Therefore, it is a goal for those skilled in the art to optimize the liquid crystal material to obtain increased specific resistance, increased voltage holding ratio, suitable optical anisotropy, small viscosity, low threshold voltage and large dielectric anisotropy.

The prior art, such as CN102858918A, teaches a liquid crystal composition with high voltage holding ratio, low power consumption and short response time, however, the prior art is environmentally unfriendly (due to the usage of chlorine compounds) and fails to achieve a balance among such properties as a high specific resistance, low-temperature storage stability, suitable optical anisotropy, high dielectric anisotropy, short response time, low driving voltage and small viscosity required by the liquid crystal television set, flat panel TV and the like.

From the perspective of manufacture, the respective properties of the liquid crystal material are mutually influenced by each other, that is, the increase of certain property may incur changes to other properties. Therefore, it requires inventive efforts to prepare a liquid crystal material with suitable properties on all aspects.

The liquid crystal material is an important component of the liquid crystal display. There are huge demand in the global market for the liquid crystal displays, which are used primarily in the electronic products but suffer from a short operating life. A short operating life implies the problem of waste and pollution, which is more and more unacceptable with the environment-friendliness receiving increasing attention of the public. It would greatly reduce the cost of the disposal of the used liquid crystal displays to select environmentally friendly constituents in preparing the liquid crystal material. Therefore, it requires inventive efforts to prepare a liquid crystal material not only having suitable properties on all aspects, but also being economically feasible and environmentally friendly.

A purpose of the invention is to provide a liquid crystal composition with at least one of the following properties: a large specific resistance, a high voltage holding ratio, a high clear point, a suitable optical anisotropy, a suitable dielectric anisotropy, a small viscosity, a low threshold voltage, etc. To achieve the environmental friendliness, the invention forgoes the chlorine monomer for difluoroether monomers. The difluoroether monomers more than make up for the drawbacks such as elevated threshold voltage, lowered clear point and optical anisotropy, and enable faster response and improved voltage holding ratio relative to ordinary medium-polarity monomers.

Another purpose of the invention is to provide a liquid crystal display device employing a composition with at least one of the following properties: a large specific resistance, a high voltage holding ratio, a high clear point, a suitable optical anisotropy, a suitable dielectric anisotropy, a small viscosity, a low threshold voltage, etc., and having characteristics such as a high voltage holding ratio, a short response time, a high contrast ratio, a low power consumption and environmental friendliness.

SUMMARY

A purpose of the invention is to provide an environmentally friendly liquid crystal composition with at least one of the following properties: a large specific resistance, a high voltage holding ratio, a high clear point, a suitable optical anisotropy, a suitable dielectric anisotropy, a small viscosity, a low threshold voltage, etc.

Another purpose of the invention is to provide a liquid crystal display device employing an environmentally friendly liquid crystal composition with at least one of the following properties: a large specific resistance, a high voltage holding ratio, a high clear point, a suitable optical anisotropy, a suitable dielectric anisotropy, a small viscosity, a low threshold voltage, etc., such that the liquid crystal display device has a high voltage holding ratio, a high contrast ratio, a low threshold voltage, a short response time and superior power-saving performance.

To do so, the invention provides a liquid crystal composition, comprising:

one or more compounds of general formula I accounting for 1-30% of the total weight of the liquid crystal composition

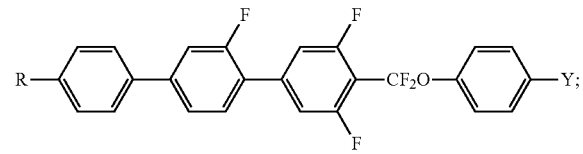

I one or more compounds of general formula II accounting for 1-30% of the total weight of the liquid crystal composition

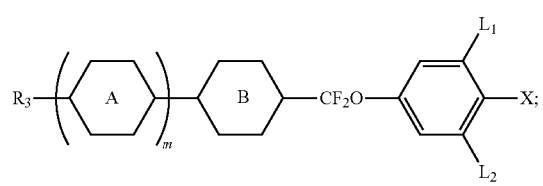

II one or more compounds of general formula III accounting for 1-20% of the total weight of the liquid crystal composition

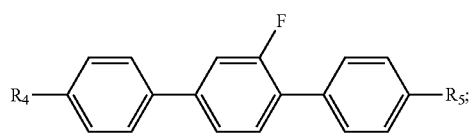

III and one or more compounds of general formula IV accounting for 30-80% of the total weight of the liquid crystal composition

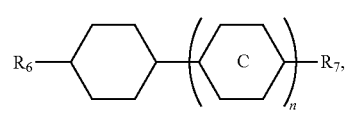

IV

Wherein,

R, $R_4$, $R_5$, $R_6$ and $R_7$ are the same or different, and each independently represents an alkyl having 1-7 carbon atoms, an alkoxy having 1-7 carbon atoms or an alkenyl having 2-7 carbon atoms;

$R_3$ represents H, an alkyl having 1-7 carbon atoms, an alkoxy having 1-7 carbon atoms or an alkenyl having 2-7 carbon atoms;

The ring

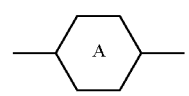

represents

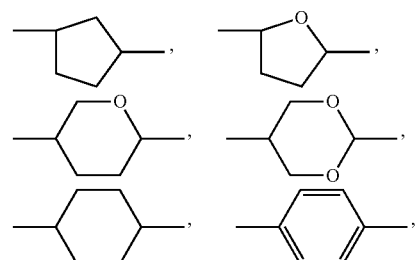

or

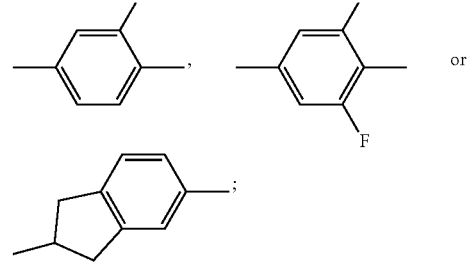

;

The ring

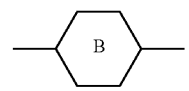

and the ring

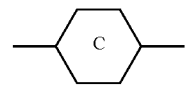

are the same or different, and each independently represents

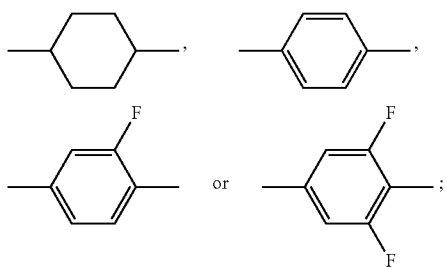

Y represents —CF$_3$ or —OCF$_3$;
X represents —F or —OCF$_2$—CF=CF$_2$;
L$_1$ and L$_2$ are the same or different, and each independently represents —H or —F;
m represents 1, 2 or 3;
n represents 1 or 2;
when m is 2 or 3, there are a plurality of rings

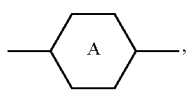

in which the rings

may be the same or different, and each independently represents

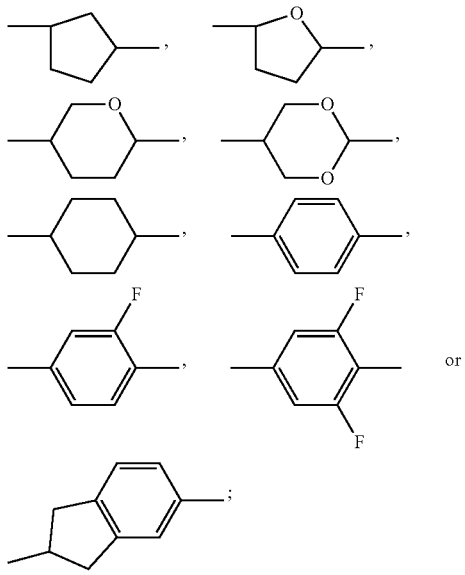

when n is 2, there are a plurality of rings

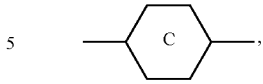

in which the rings

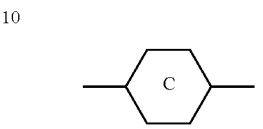

may be the same or different, and each independently represents

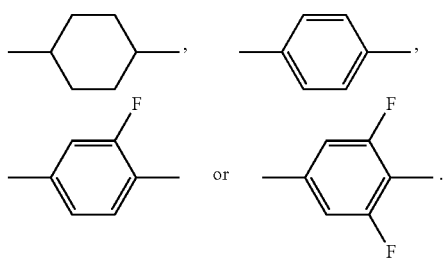

In an embodiment of the invention, the compounds of general formula I are selected from the group consisting of the following compounds IA
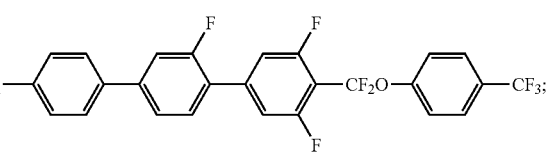

IB
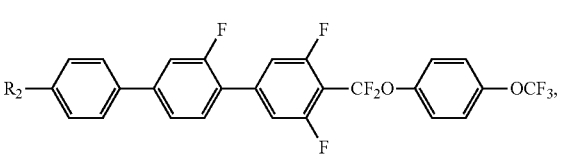

Wherein,
R$_1$, R$_2$ are the same or different, and each independently represents an alkyl having 1-7 carbon atoms or an alkoxy having 1-7 carbon atoms.

In an embodiment of the invention, the compounds of general formula IA account for 1-30% of the total weight of the liquid crystal composition.

In an embodiment of the invention, the compounds of general formula IA, preferably, account for 1-15% of the total weight of the liquid crystal composition.

In an embodiment of the invention, the compounds of general formula IA, more preferably, account for 5-9% of the total weight of the liquid crystal composition.

In an embodiment of the invention, the compounds of general formula IB account for 1-30% of the total weight of the liquid crystal composition.

In an embodiment of the invention, the compounds of general formula IB, preferably, account for 1-15% of the total weight of the liquid crystal composition.

In an embodiment of the invention, the compounds of general formula IB, more preferably, account for 5-9% of the total weight of the liquid crystal composition.

In an embodiment of the invention, the liquid crystal composition preferably comprises:

one or more compounds of general formula IA accounting for 1-30% of the total weight of the liquid crystal composition

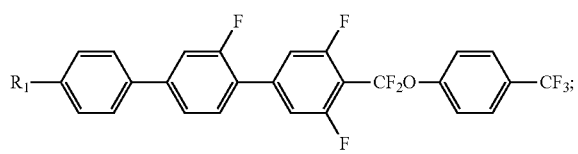

IA one or more compounds of general formula II accounting for 1-30% of the total weight of the liquid crystal composition

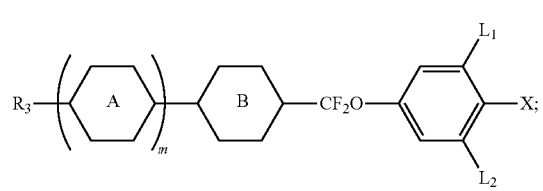

II one or more compounds of general formula III accounting for 1-20% of the total weight of the liquid crystal composition

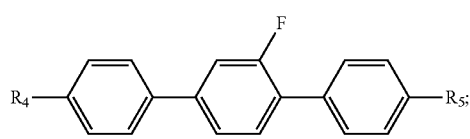

III and one or more compounds of general formula IV accounting for 30-80% of the total weight of the liquid crystal composition

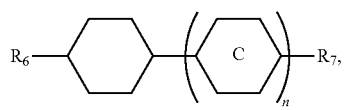

IV

Wherein, $R_1$ represents an alkyl having 1-7 carbon atoms or an alkoxy having 1-7 carbon atoms;

$R_3$ represents H, an alkyl having 1-7 carbon atoms, an alkoxy having 1-7 carbon atoms or an alkenyl having 2-7 carbon atoms;

$R_4$, $R_5$, $R_6$ and $R_7$ are the same or different, and each independently represents an alkyl having 1-7 carbon atoms, an alkoxy having 1-7 carbon atoms or an alkenyl having 2-7 carbon atoms;

The ring

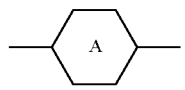

represents

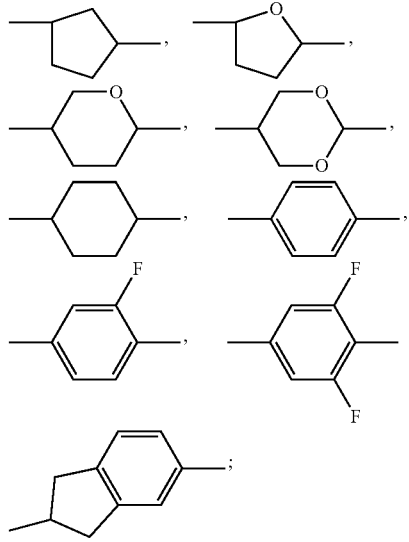

The ring

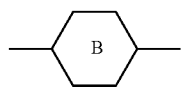

and the ring

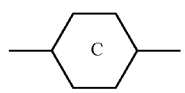

are the same or different, and each independently represents

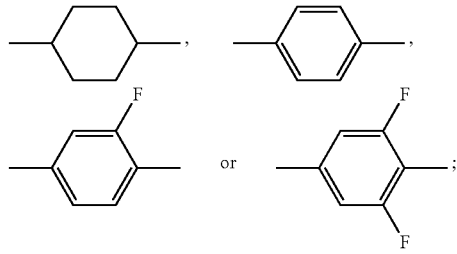

X represents —F or —OCF$_2$—CF=CF$_2$;

L$_1$ and L$_2$ are the same or different, and each independently represents —H or —F;

m represents 1, 2 or 3;

n represents 1 or 2;

when m is 2 or 3, there are a plurality of rings

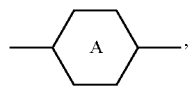

in which the rings

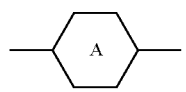

may be the same or different, and each independently represents

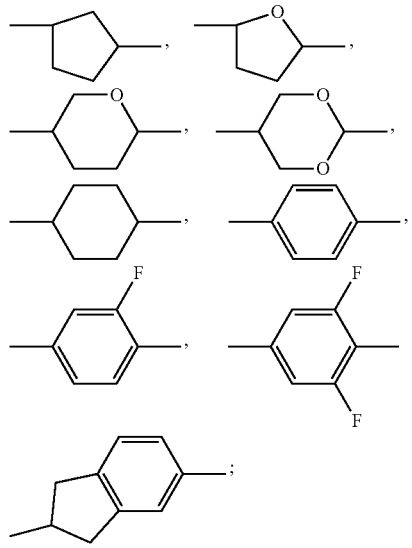

when n is 2, there are a plurality of rings

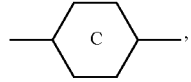

in which the rings

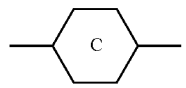

may be the same or different, and each independently represents

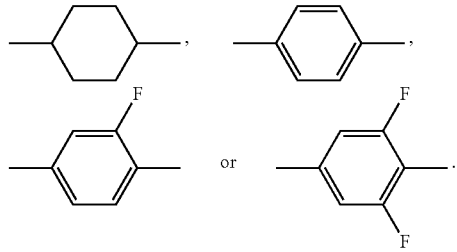

In an embodiment of the invention, the liquid crystal composition preferably comprises:

one or more compounds of general formula IB accounting for 1-30% of the total weight of the liquid crystal composition

IB

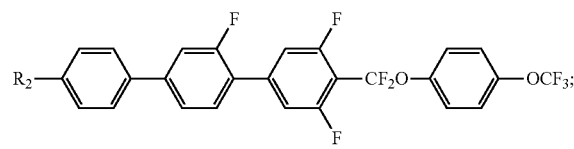

one or more compounds of general formula II accounting for 1-30% of the total weight of the liquid crystal composition

II

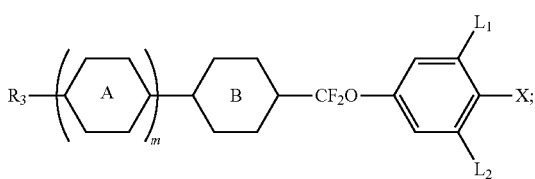

one or more compounds of general formula III accounting for 1-20% of the total weight of the liquid crystal composition

III

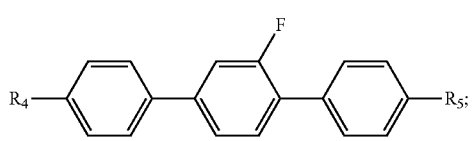

and one or more compounds of general formula IV accounting for 30-80% of the total weight of the liquid crystal composition

IV

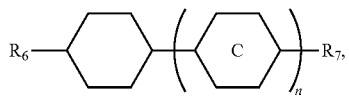

Wherein,

R$_2$ represents an alkyl having 1-7 carbon atoms or an alkoxy having 1-7 carbon atoms;

R$_3$ represents H, an alkyl having 1-7 carbon atoms, an alkoxy having 1-7 carbon atoms or an alkenyl having 2-7 carbon atoms;

R$_4$, R$_5$, R$_6$ and R$_7$ are the same or different, and each independently represents an alkyl having 1-7 carbon atoms, an alkoxy having 1-7 carbon atoms or an alkenyl having 2-7 carbon atoms;

The ring

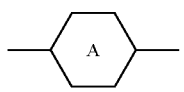

represents

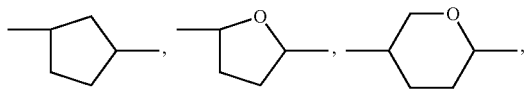

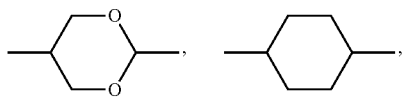

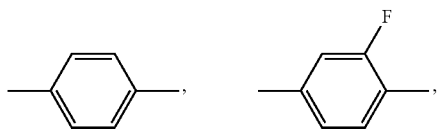

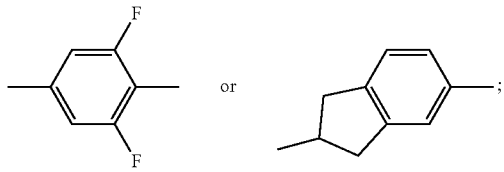

The ring

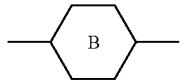

and the ring

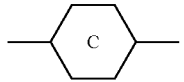

are the same or different, and each independently represents

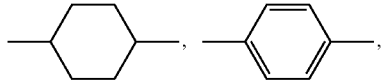

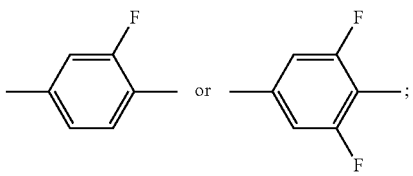

X represents —F or —OCF$_2$—CF=CF$_2$;

L$_1$ and L$_2$ are the same or different, and each independently represents —H or —F;

m represents 1, 2 or 3;

n represents 1 or 2;

when m is 2 or 3, there are a plurality of rings

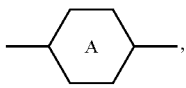

in which the rings

may be the same or different, and each independently represents

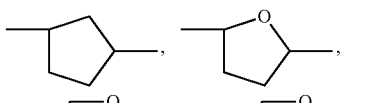

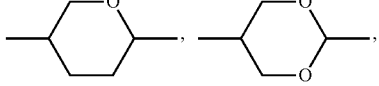

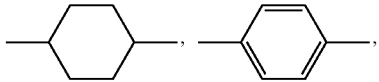

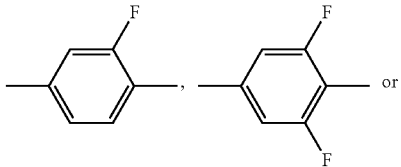

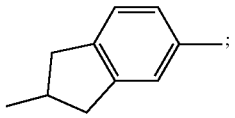

when n is 2, there are a plurality of rings

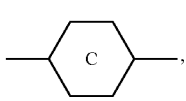

in which the rings

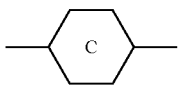

may be the same or different, and each independently represents

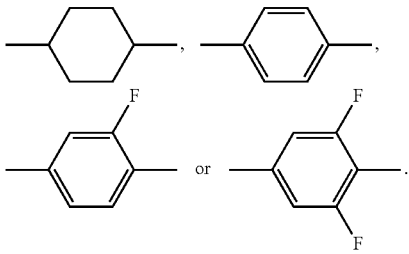

In an embodiment of the invention, the liquid crystal composition preferably comprises:

one or more compounds of general formula IA accounting for 1-30% of the total weight of the liquid crystal composition

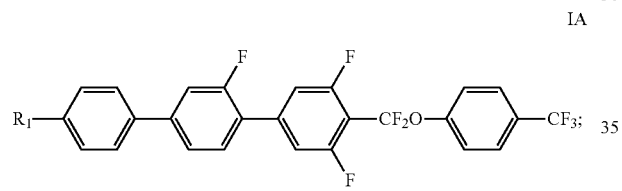

IA one or more compounds of general formula IB accounting for 1-30% of the total weight of the liquid crystal composition

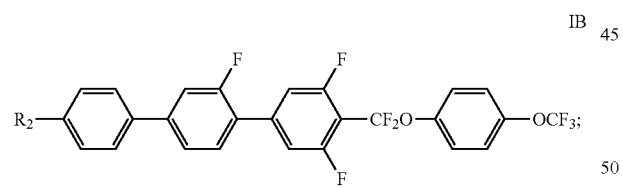

IB one or more compounds of general formula II accounting for 1-30% of the total weight of the liquid crystal composition

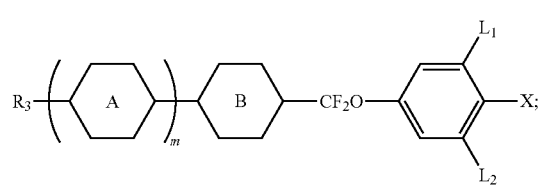

II one or more compounds of general formula III accounting for 1-20% of the total weight of the liquid crystal composition

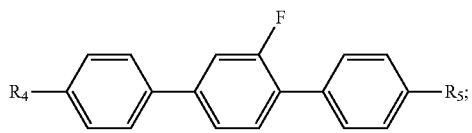

III and
one or more compounds of general formula IV accounting for 30-80% of the total weight of the liquid crystal composition

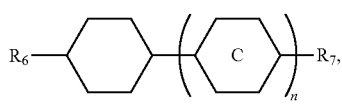

IV

Wherein,
$R_1$ and $R_2$ are the same or different, and each independently represents an alkyl having 1-7 carbon atoms or an alkoxy having 1-7 carbon atoms;

$R_3$ represents H, an alkyl having 1-7 carbon atoms, an alkoxy having 1-7 carbon atoms or an alkenyl having 2-7 carbon atoms;

$R_4$, $R_5$, $R_6$ and $R_7$ are the same or different, and each independently represents an alkyl having 1-7 carbon atoms, an alkoxy having 1-7 carbon atoms or an alkenyl having 2-7 carbon atoms;

The ring

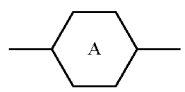

represents

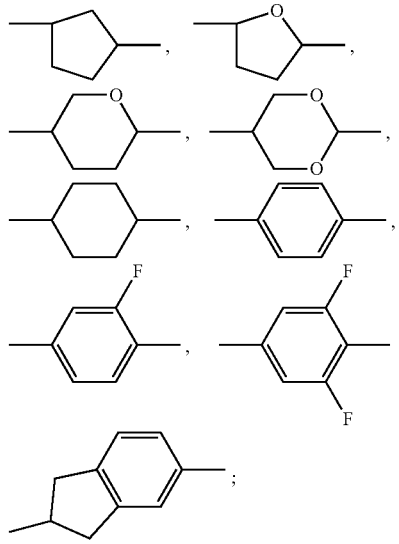

The ring

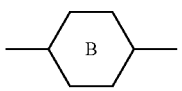

and the ring

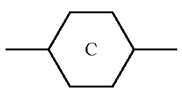

are the same or different, and each independently represents

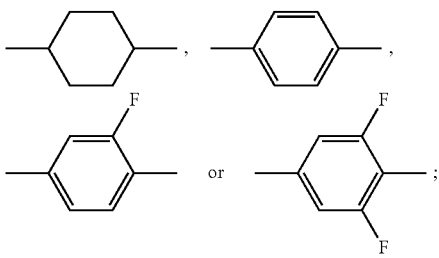

X represents —F or —OCF$_2$—CF=CF$_2$;

L$_1$ and L$_2$ are the same or different, and each independently represents —H or —F;

m represents 1, 2 or 3;

n represents 1 or 2;

when m is 2 or 3, there are a plurality of rings

in which the rings

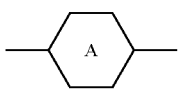

may be the same or different, and each independently represents

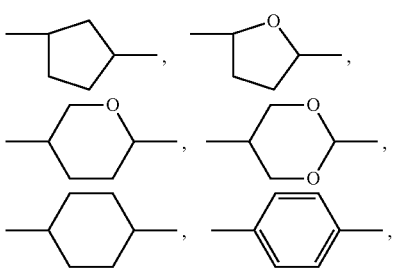

when n is 2, there are a plurality of rings

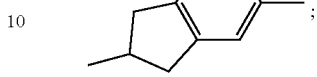

in which the rings

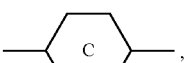

may be the same or different, and each independently represents

In an embodiment of the invention, the liquid crystal composition preferably only comprises:

one or more compounds selected from the compounds of general formula IA and/or the compounds of general formula IB, accounting for 1-30% of the total weight of the liquid crystal composition

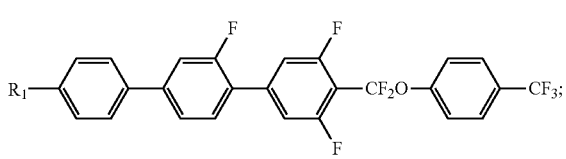

IA

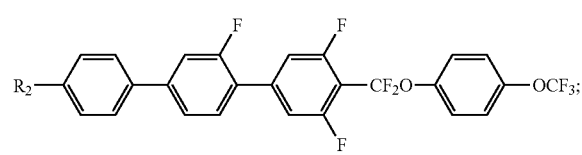

IB one or more compounds of general formula II accounting for 1-30% of the total weight of the liquid crystal composition

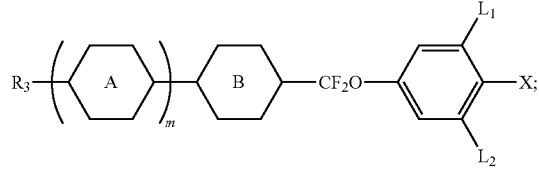

II one or more compounds of general formula III accounting for 1-20% of the total weight of the liquid crystal composition

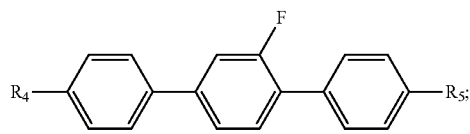

III and
one or more compounds of general formula IV accounting for 30-80% of the total weight of the liquid crystal composition

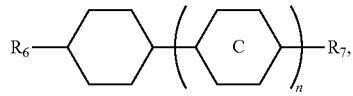

IV

Wherein,
$R_1$ and $R_2$ are the same or different, and each independently represents an alkyl having 1-7 carbon atoms or an alkoxy having 1-7 carbon atoms;
$R_3$ represents H, an alkyl having 1-7 carbon atoms, an alkoxy having 1-7 carbon atoms or an alkenyl having 2-7 carbon atoms;
$R_4$, $R_5$, $R_6$ and $R_7$ are the same or different, and each independently represents an alkyl having 1-7 carbon atoms, an alkoxy having 1-7 carbon atoms or an alkenyl having 2-7 carbon atoms;
The ring

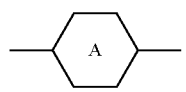

represents

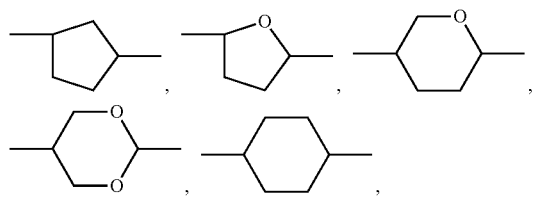

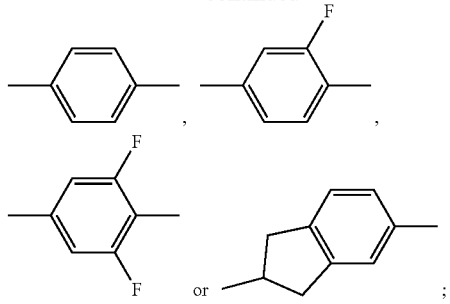

The ring

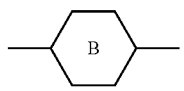

and the ring

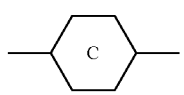

are the same or different, and each independently represents

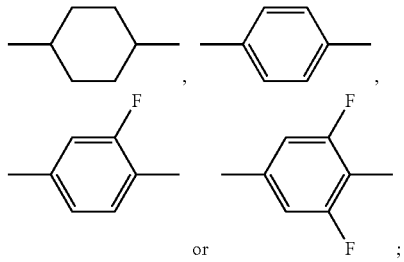

X represents —F or —OCF$_2$—CF=CF$_2$;
$L_1$ and $L_2$ are the same or different, and each independently represents —H or —F;
m represents 1, 2 or 3;
n represents 1 or 2;
when m is 2 or 3, there are a plurality of rings

in which the rings

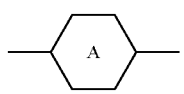

may be the same or different, and each independently represents

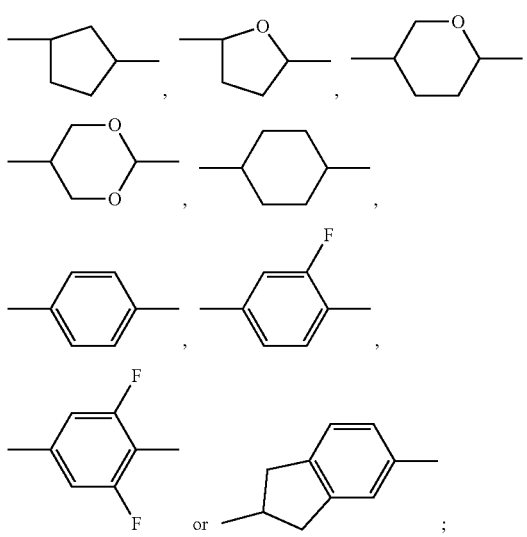

when n is 2, there are a plurality of rings

in which the rings

may be the same or different, and each independently represents

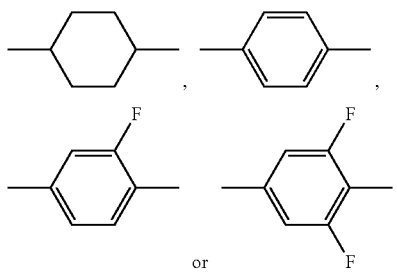

In some embodiments of the invention, $R_3$ represents H or an alkyl having 1-7 carbon atoms.

In some embodiments of the invention, the ring

represents

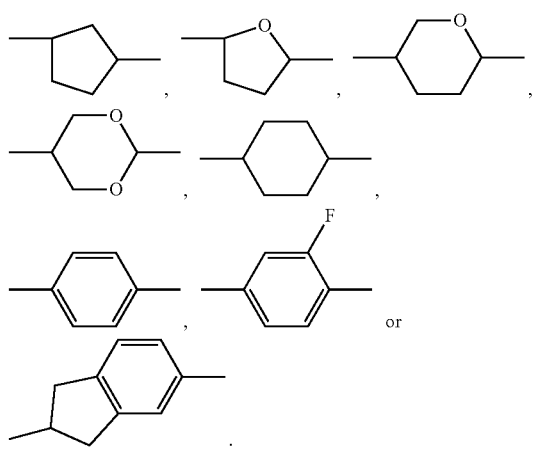

In some embodiments of the invention, the ring

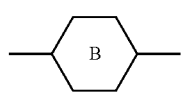

represents

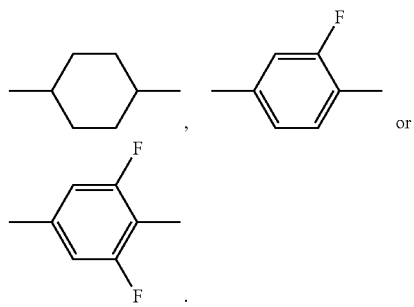

In some embodiments of the invention, the ring

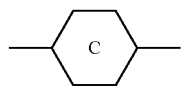

represents

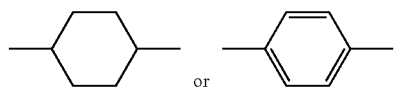

In some embodiments of the invention, X represents —F.

In some embodiments of the invention, $L_1$ and $L_2$ represent —F.

In an embodiment of the invention, the compounds of general formula IA are preferably selected from the group consisting of:

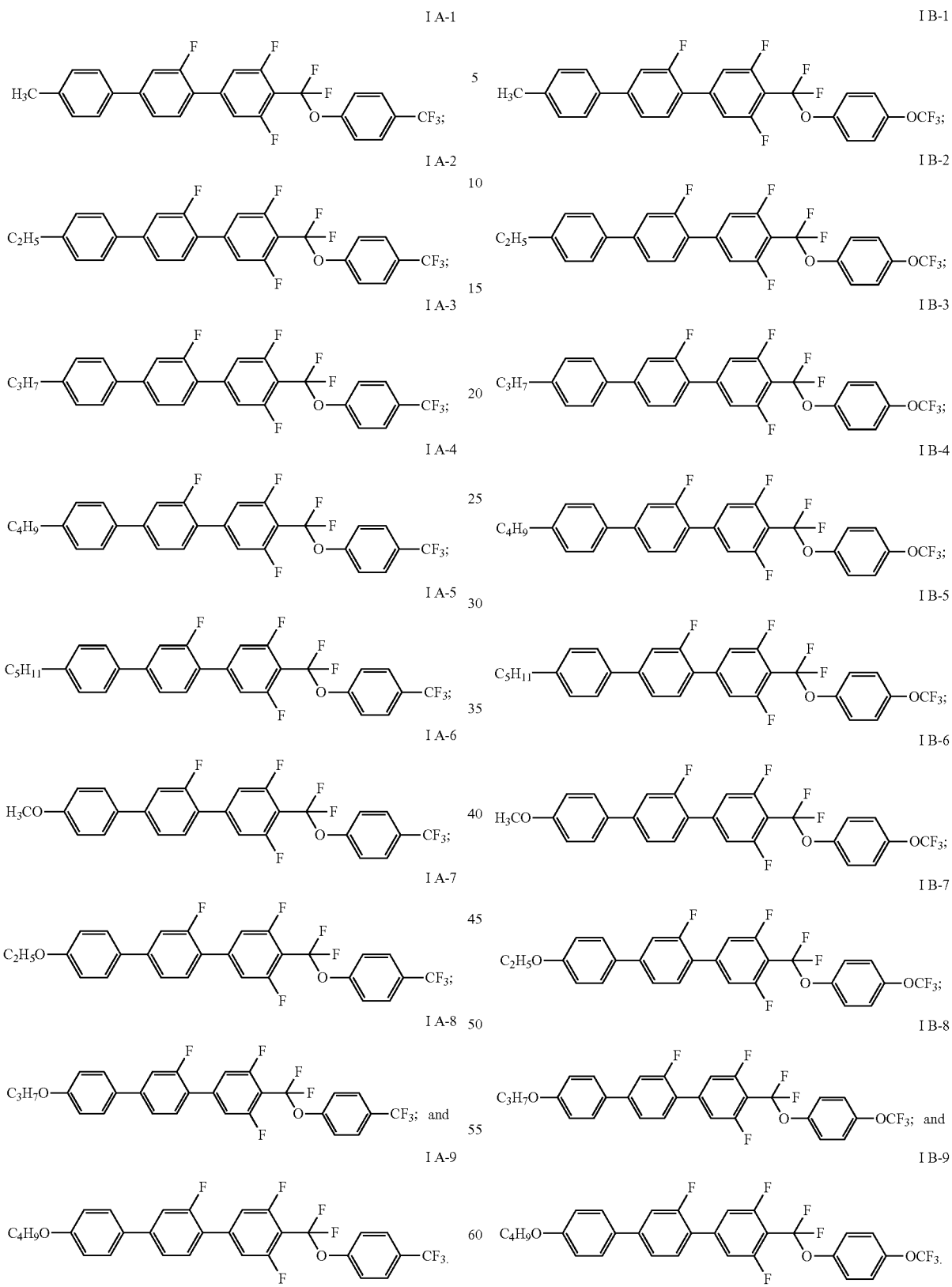
In an embodiment of the invention, the compounds of general formula IB are preferably selected from the group consisting of:
In an embodiment of the invention, the compounds of general formula II are preferably selected from the group consisting of:

II-1 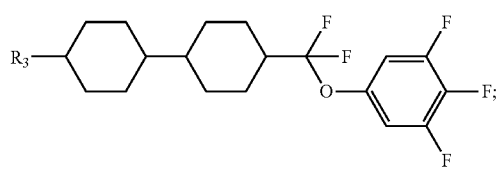
II-2 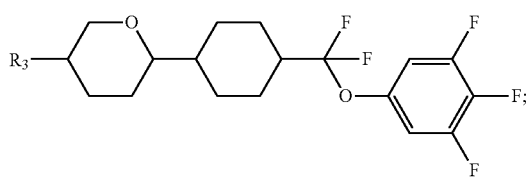
II-3 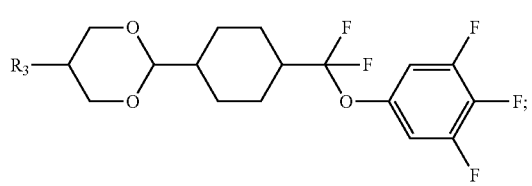
II-4 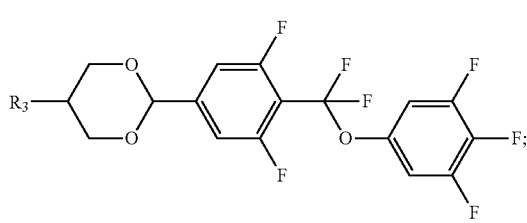
II-5 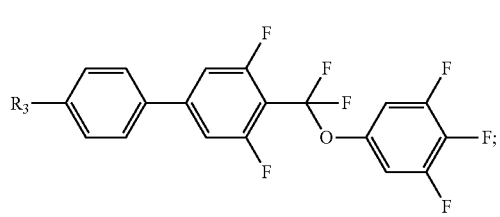
II-6 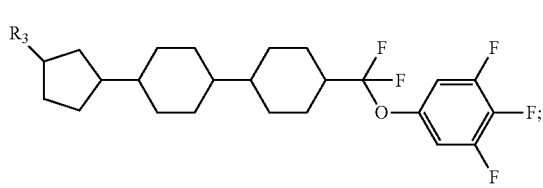
II-7 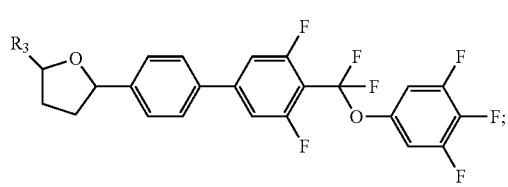
II-8 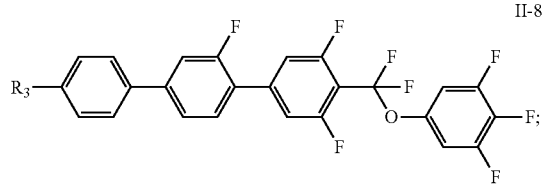
II-9 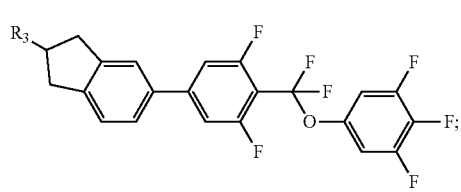
II-10 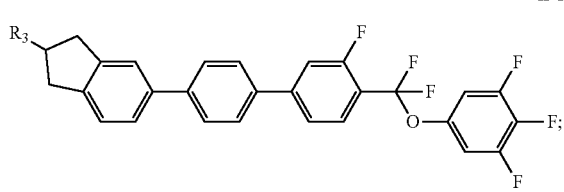
II-11 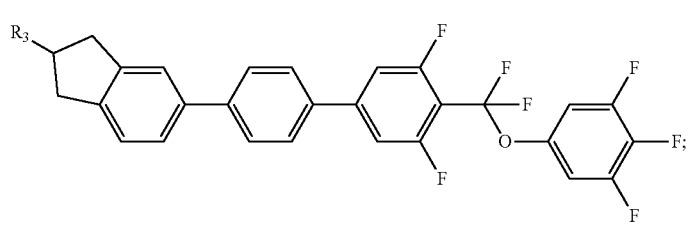
II-12 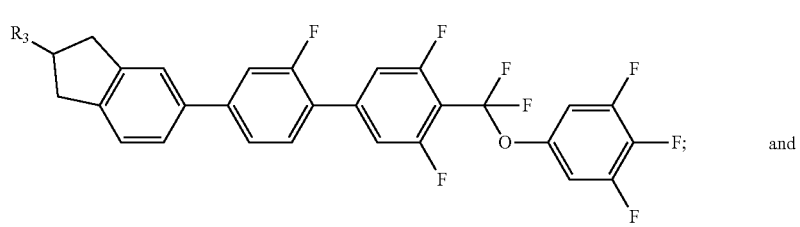 and

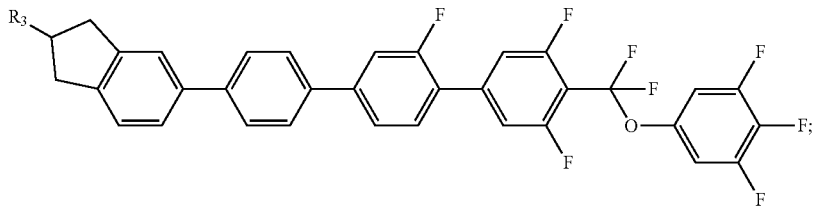

I-13

Wherein,

R₃ represents H, an alkyl having 1-7 carbon atoms or an alkoxy having 1-7 carbon atoms.

In an embodiment of the invention, more preferably, R₃ represents H or an alkyl having 1-5 carbon atoms.

In an embodiment of the invention, even more preferably, the compounds of general formula II-1 are selected from the group consisting of:

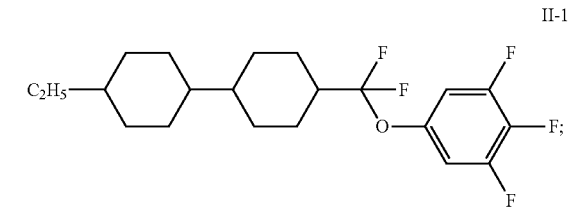

II-1-1

II-1-2

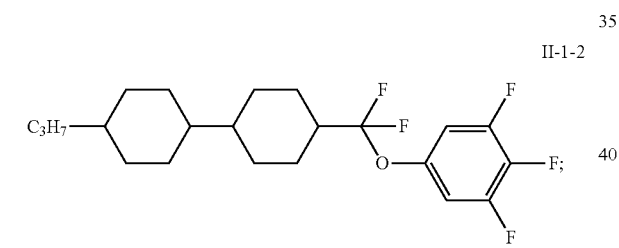

II-1-3

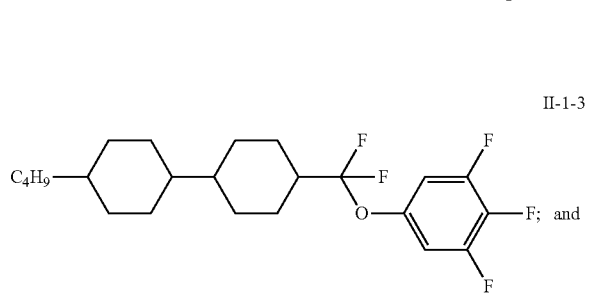

II-1-4

In an embodiment of the invention, even more preferably, the compounds of general formula II-2 are selected from the group consisting of:

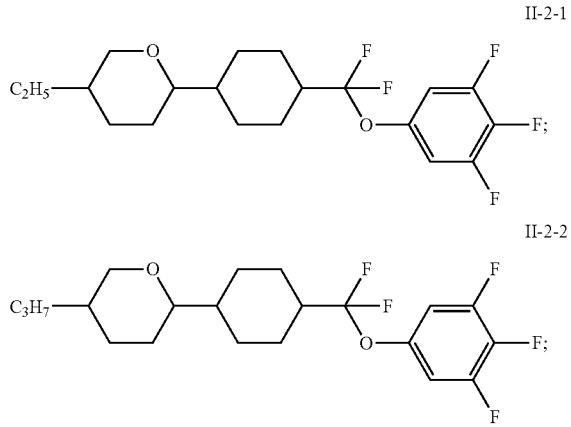

II-2-1

II-2-2

II-2-3

II-2-4

In an embodiment of the invention, even more preferably, the compounds of general formula II-3 are selected from the group consisting of:

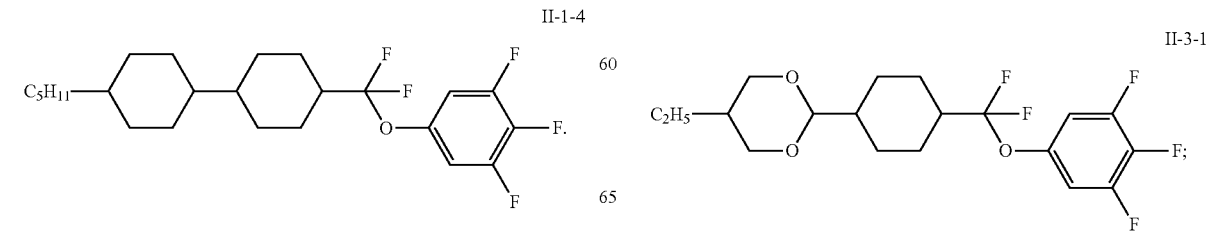

II-3-1

II-3-2
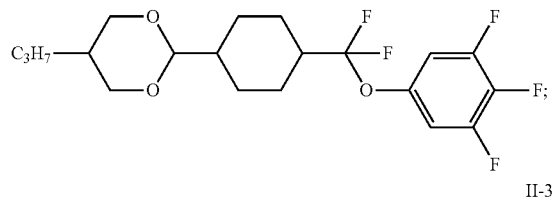

II-3-3
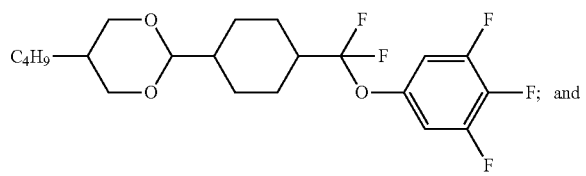

II-3-4
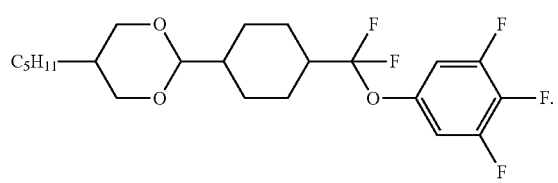

In an embodiment of the invention, even more preferably, the compounds of general formula II-4 are selected from the group consisting of:

II-4-1
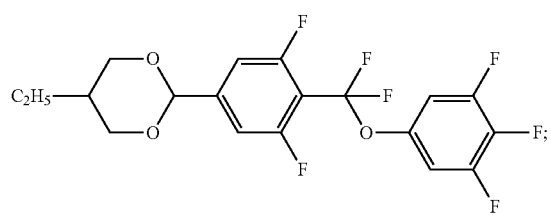

II-4-2
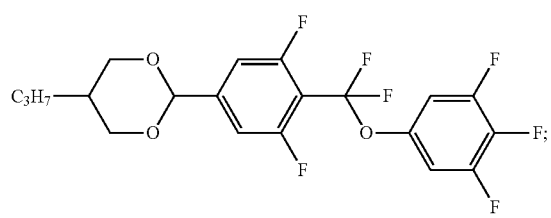

II-4-3
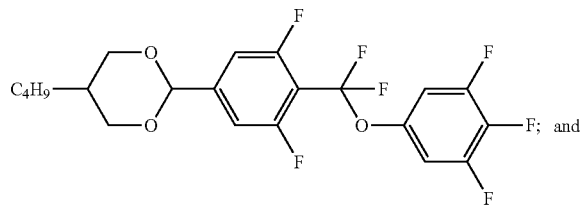

II-4-4
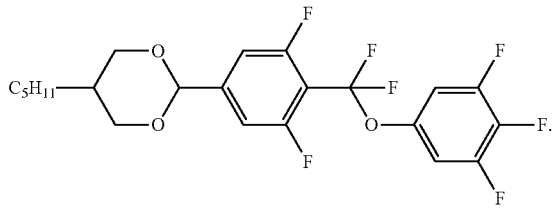

In an embodiment of the invention, even more preferably, the compounds of general formula II-5 are selected from the group consisting of:

II-5-1
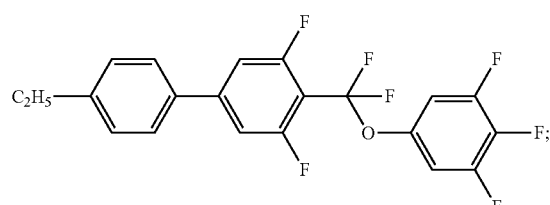

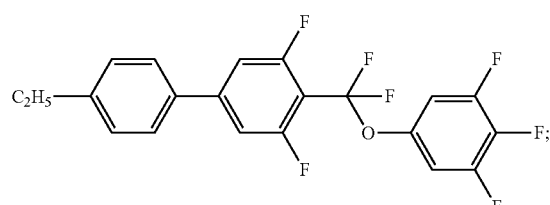

II-5-3
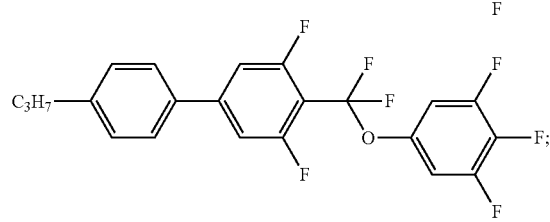

II-5-4
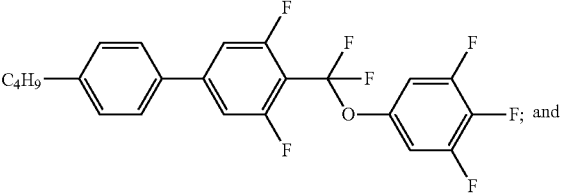

In an embodiment of the invention, even more preferably, the compounds of general formula II-6 are selected from the group consisting of:

II-6-1
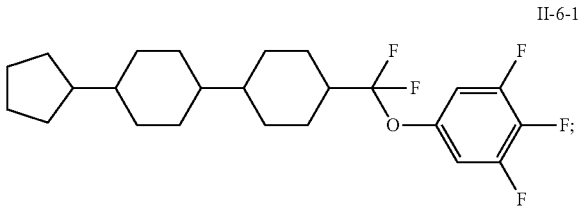

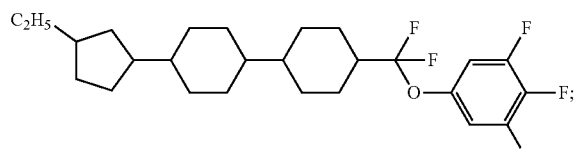
II-6-2
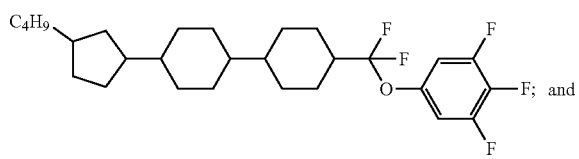
II-6-3
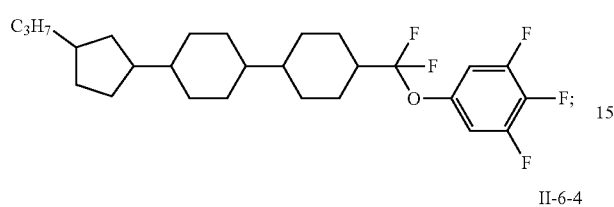
II-6-4
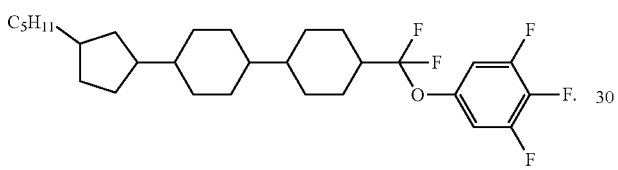
II-6-5
In an embodiment of the invention, even more preferably, the compounds of general formula II-7 are selected from the group consisting of:
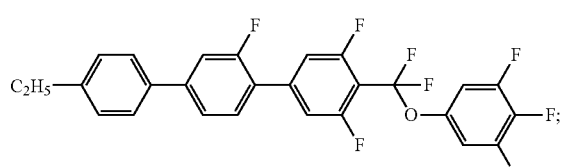
II-7-1
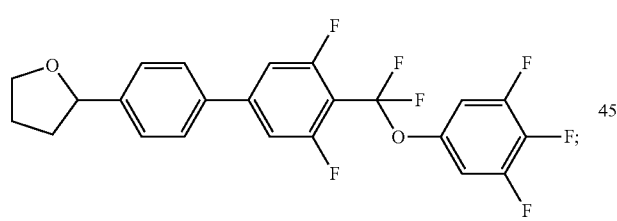
II-7-2
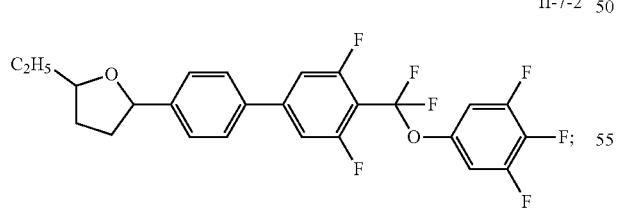
II-7-3
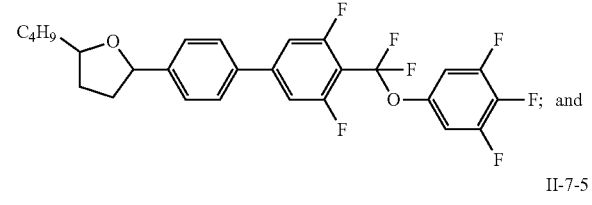
II-7-4
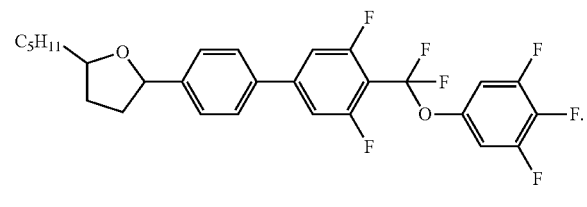
II-7-5
In an embodiment of the invention, even more preferably, the compounds of general formula II-8 are selected from the group consisting of:
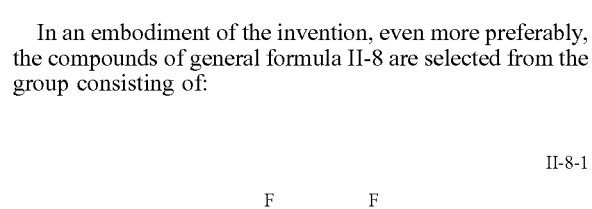
II-8-1
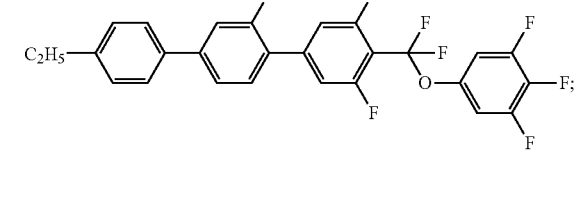
II-8-2
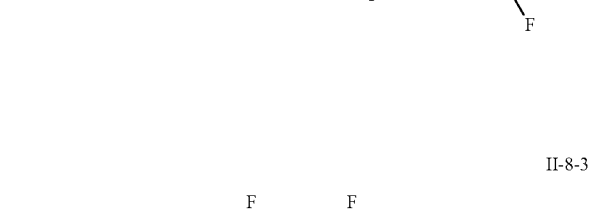
II-8-3
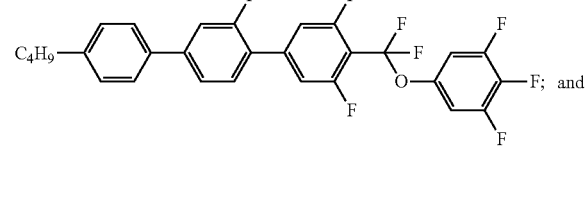
II-8-4

In an embodiment of the invention, even more preferably, the compounds of general formula II-9 are selected from the group consisting of:

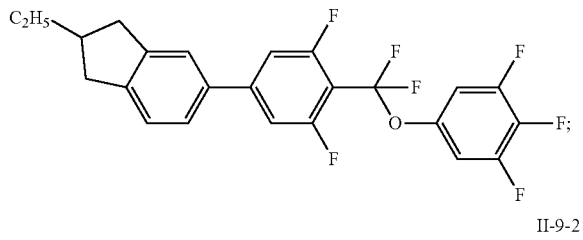

II-9-2

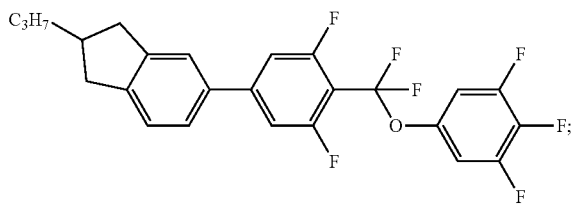

II-9-3

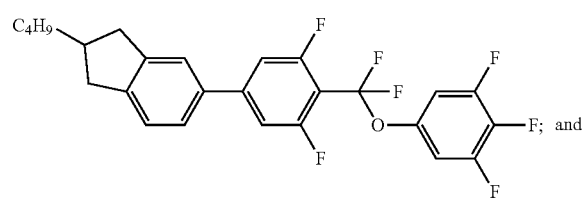

II-9-4

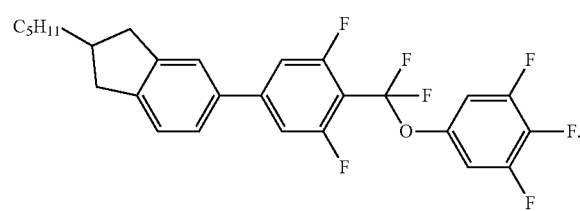

In an embodiment of the invention, even more preferably, the compounds of general formula II-10 are selected from the group consisting of:

II-10-1

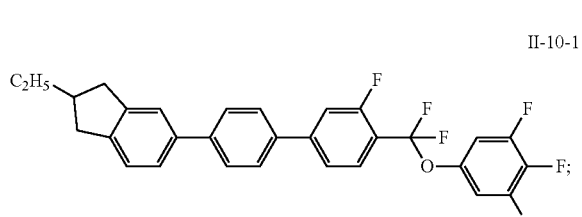

II-10-2

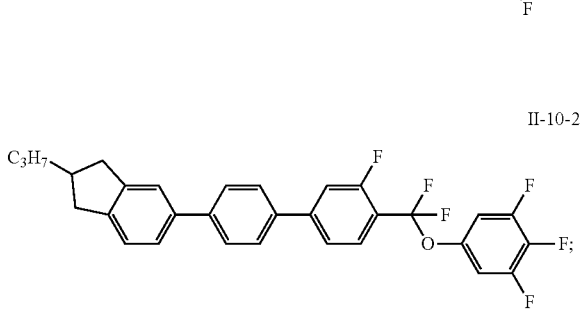

II-10-3

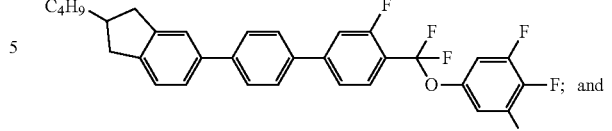

II-10-4

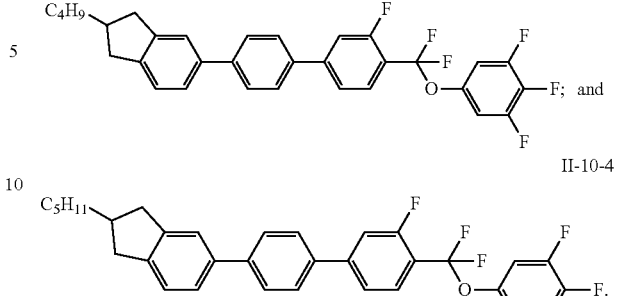

In an embodiment of the invention, even more preferably, the compounds of general formula II-11 are selected from the group consisting of:

II-11-1

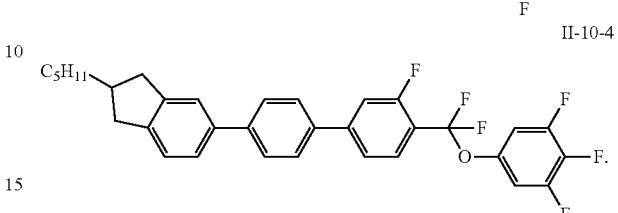

II-11-2

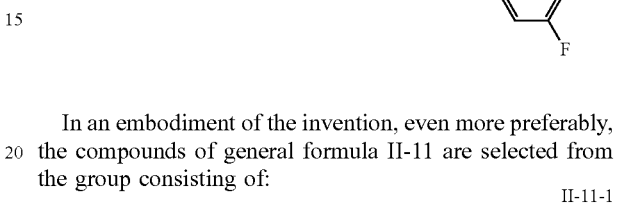

II-11-3

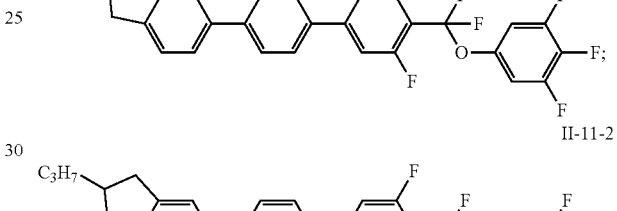

II-11-4

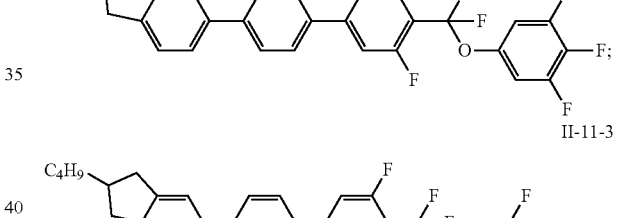

In an embodiment of the invention, even more preferably, the compounds of general formula II-12 are selected from the group consisting of:

II-12-1

-continued

II-12-2

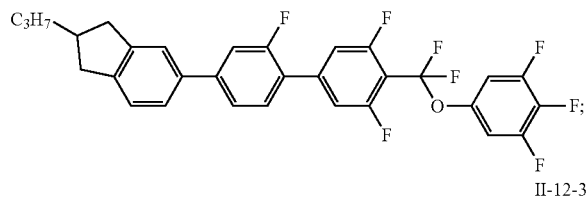

II-12-3

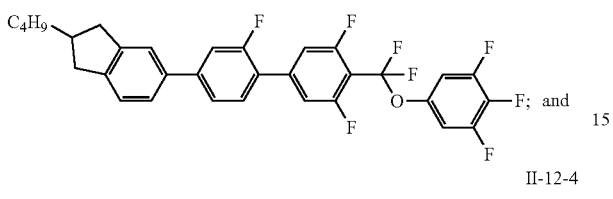
; and

II-12-4

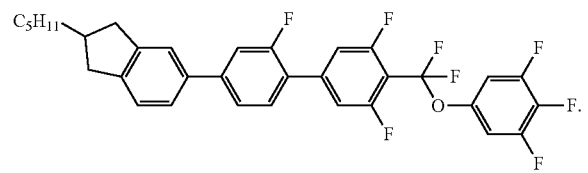

In an embodiment of the invention, even more preferably, the compounds of general formula II-13 are selected from the group consisting of:

In an embodiment of the invention, preferably, $R_4$ and $R_5$ are the same or different, and each independently represents an alkyl having 1-5 carbon atoms or an alkenyl having 2-5 carbon atoms;

In an embodiment of the invention, more preferably, the compounds of general formula III are selected from the group consisting of:

III-1

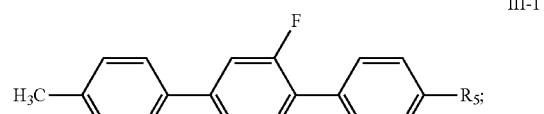

III-2

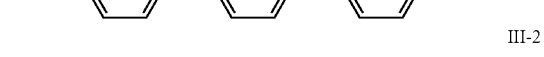

III-3

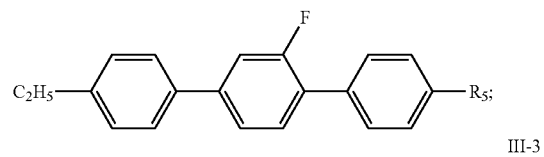

II-13-1

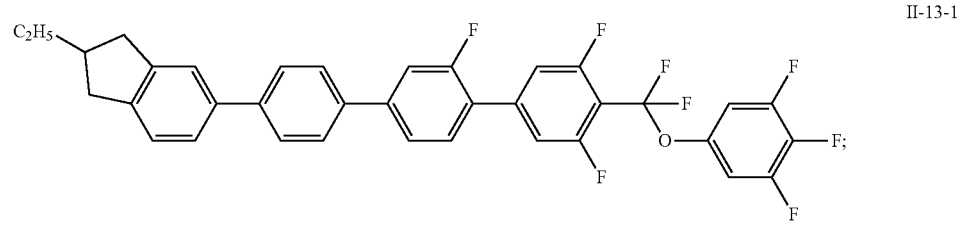

II-13-2

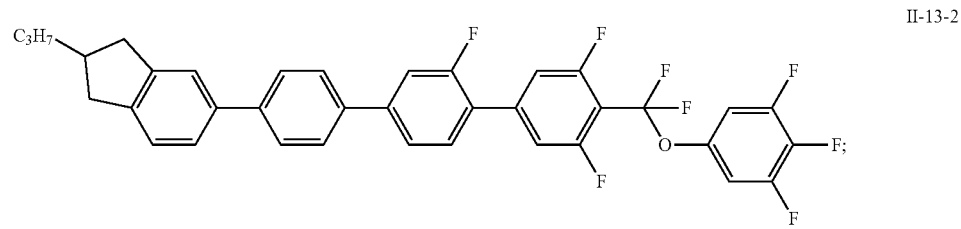

II-13-3

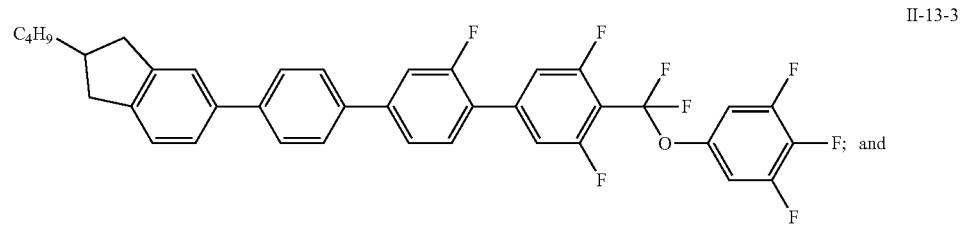
; and

II-13-4

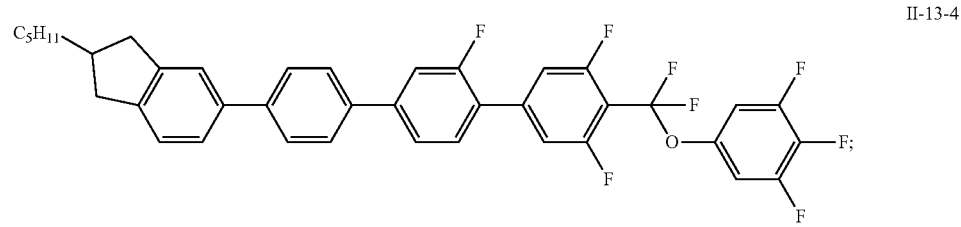

III-4

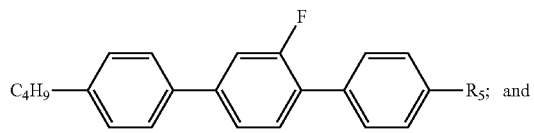

III-5

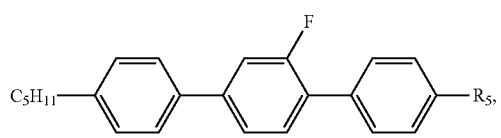

Wherein,

R$_5$ represents an alkyl having 1-5 carbon atoms or an alkenyl having 2-5 carbon atoms.

In an embodiment of the invention, even more preferably, the compounds of general formula III-1 are selected from the group consisting of:

III-1-1

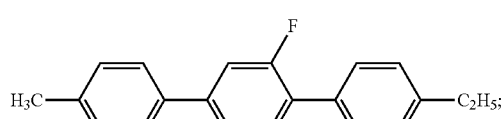

III-1-2

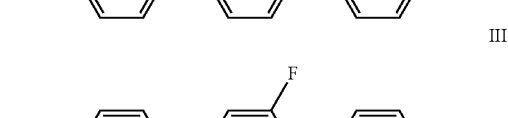

III-1-3

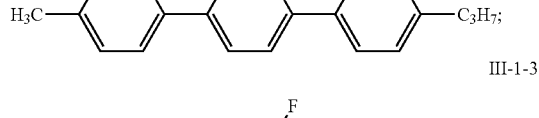

III-1-4

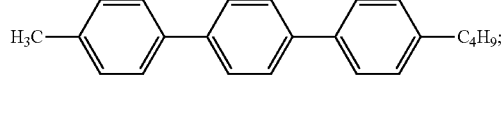

III-1-5

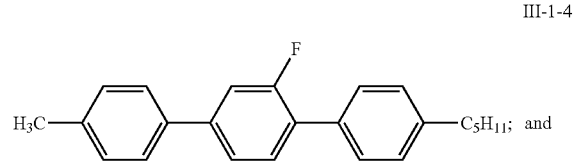

In an embodiment of the invention, even more preferably, the compounds of general formula III-2 are selected from the group consisting of:

III-2-1

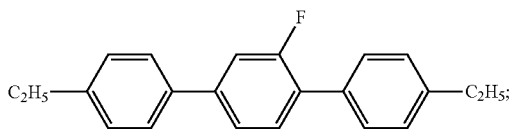

III-2-2

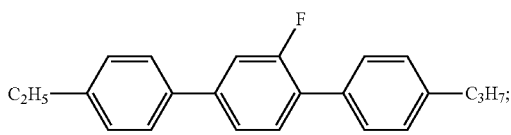

III-2-3

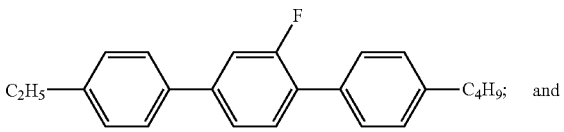

III-2-4

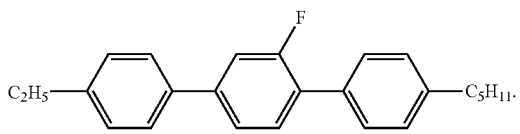

In an embodiment of the invention, even more preferably, the compounds of general formula III-3 are selected from the group consisting of:

III-3-1

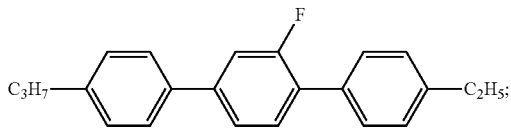

III-3-2

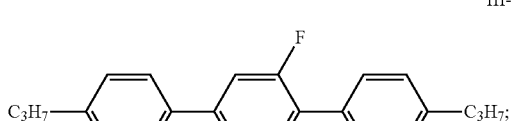

III-3-3

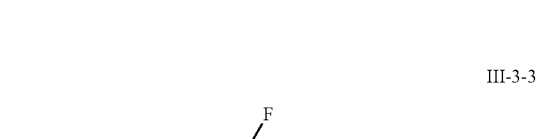

III-3-4

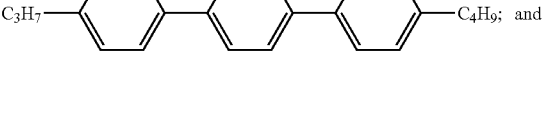

In an embodiment of the invention, even more preferably, the compounds of general formula III-4 are selected from the group consisting of:

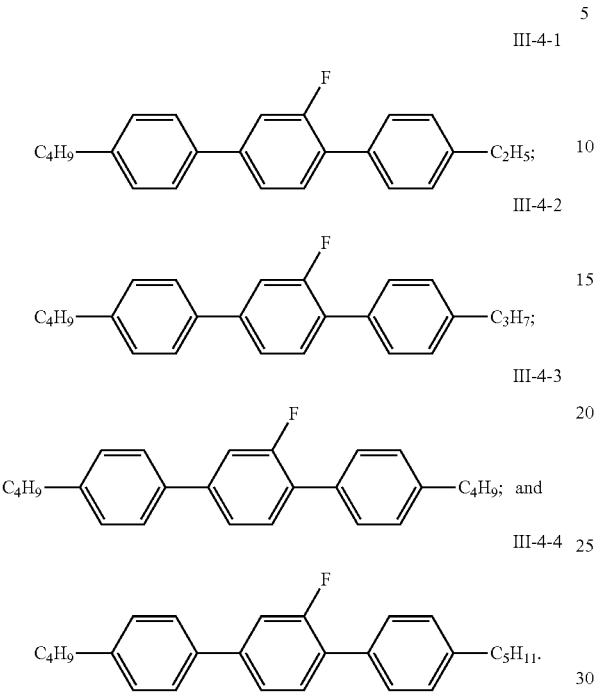

III-4-1
III-4-2
III-4-3
III-4-4

In an embodiment of the invention, even more preferably, the compounds of general formula III-5 are selected from the group consisting of:

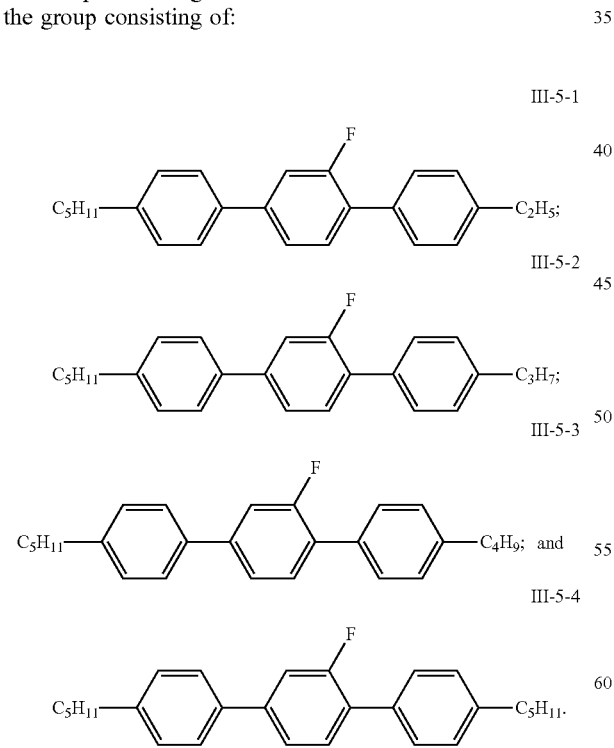

III-5-1
III-5-2
III-5-3
III-5-4

In an embodiment of the invention, preferably, the compounds of general formula IV are selected from the group consisting of:

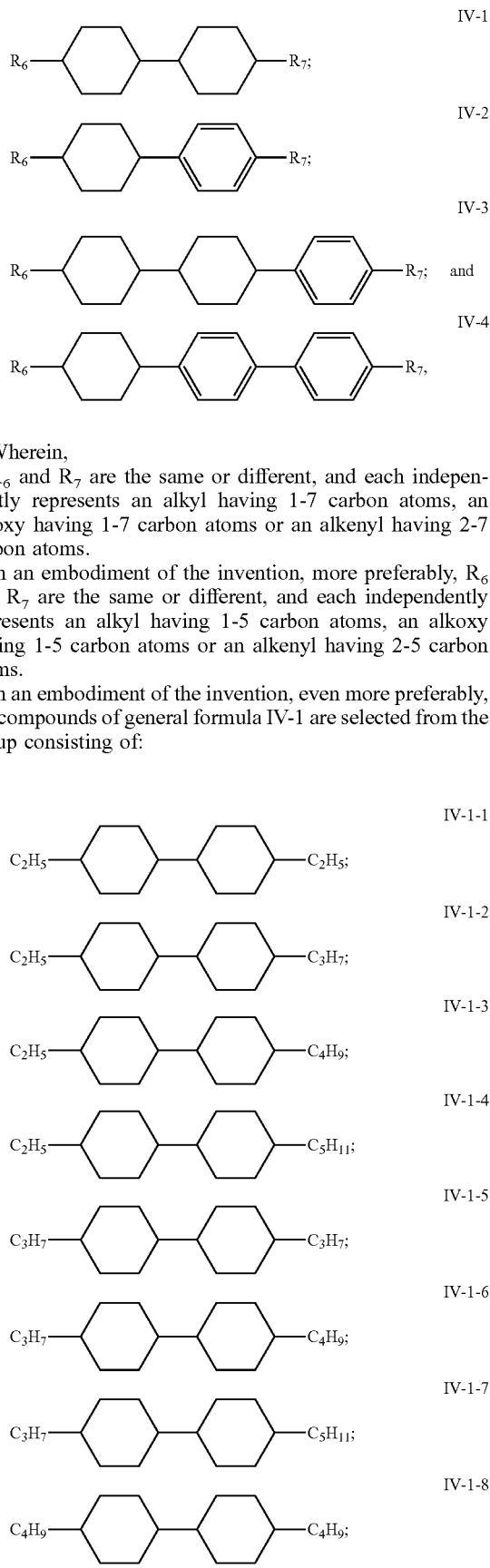

IV-1
IV-2
IV-3
IV-4

Wherein, $R_6$ and $R_7$ are the same or different, and each independently represents an alkyl having 1-7 carbon atoms, an alkoxy having 1-7 carbon atoms or an alkenyl having 2-7 carbon atoms.

In an embodiment of the invention, more preferably, $R_6$ and $R_7$ are the same or different, and each independently represents an alkyl having 1-5 carbon atoms, an alkoxy having 1-5 carbon atoms or an alkenyl having 2-5 carbon atoms.

In an embodiment of the invention, even more preferably, the compounds of general formula IV-1 are selected from the group consisting of:

IV-1-1
IV-1-2
IV-1-3
IV-1-4
IV-1-5
IV-1-6
IV-1-7
IV-1-8

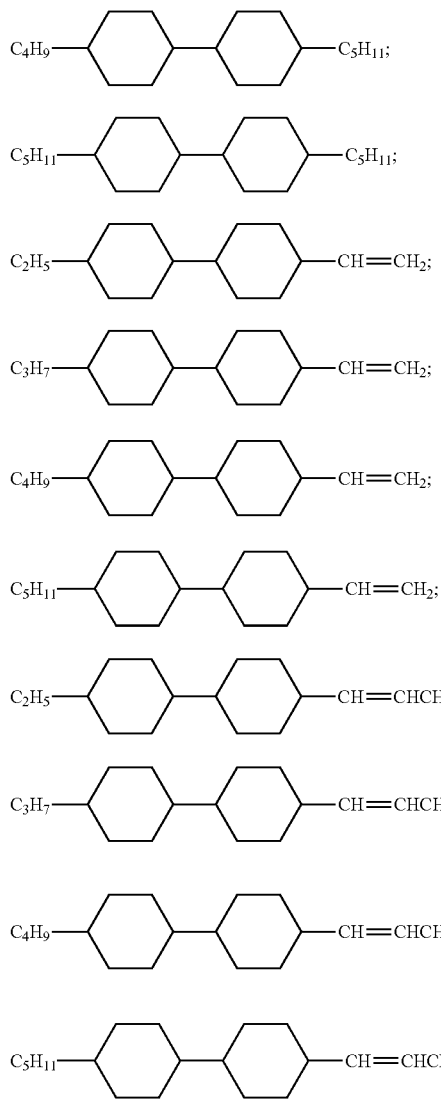
In an embodiment of the invention, even more preferably, the compounds of general formula IV-2 are selected from the group consisting of:
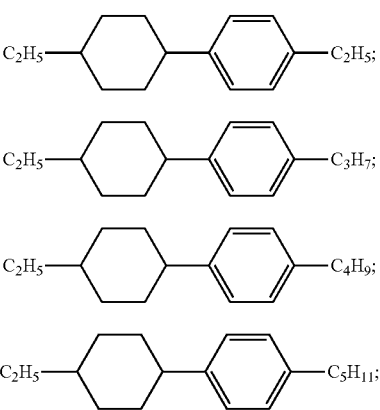

In an embodiment of the invention, even more preferably, the compounds of general formula IV-3 are selected from the group consisting of:
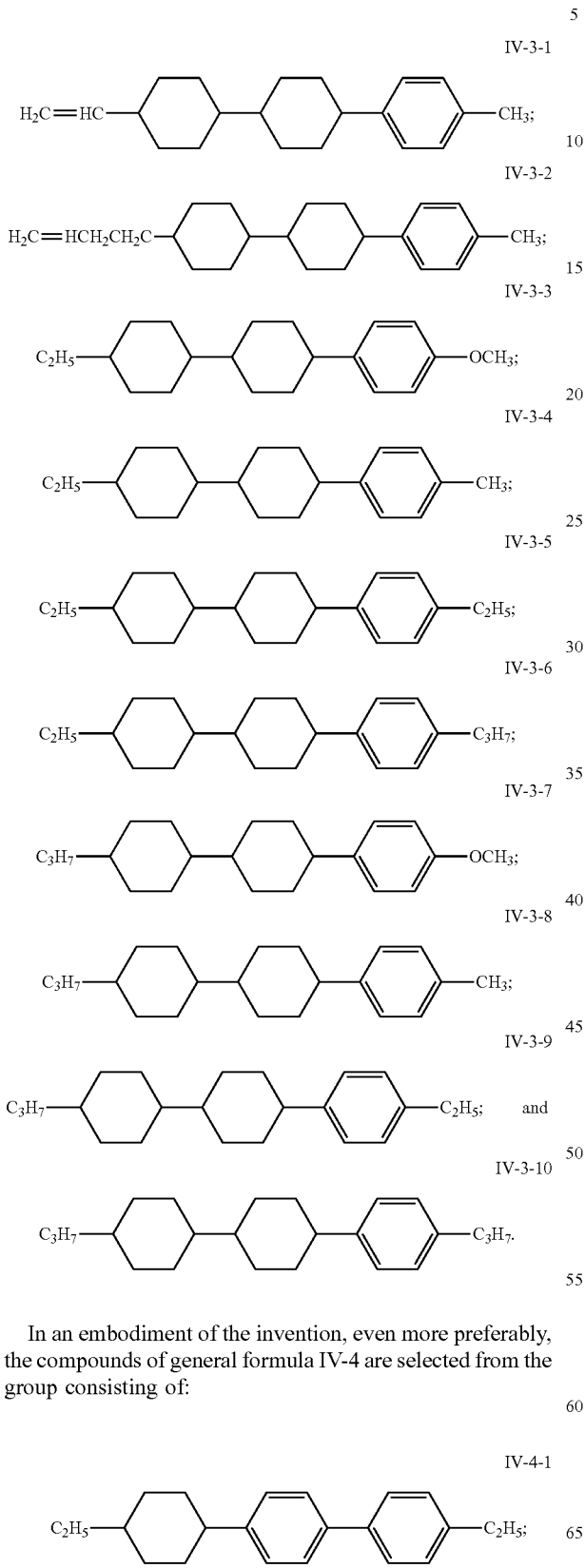
In an embodiment of the invention, even more preferably, the compounds of general formula IV-4 are selected from the group consisting of:
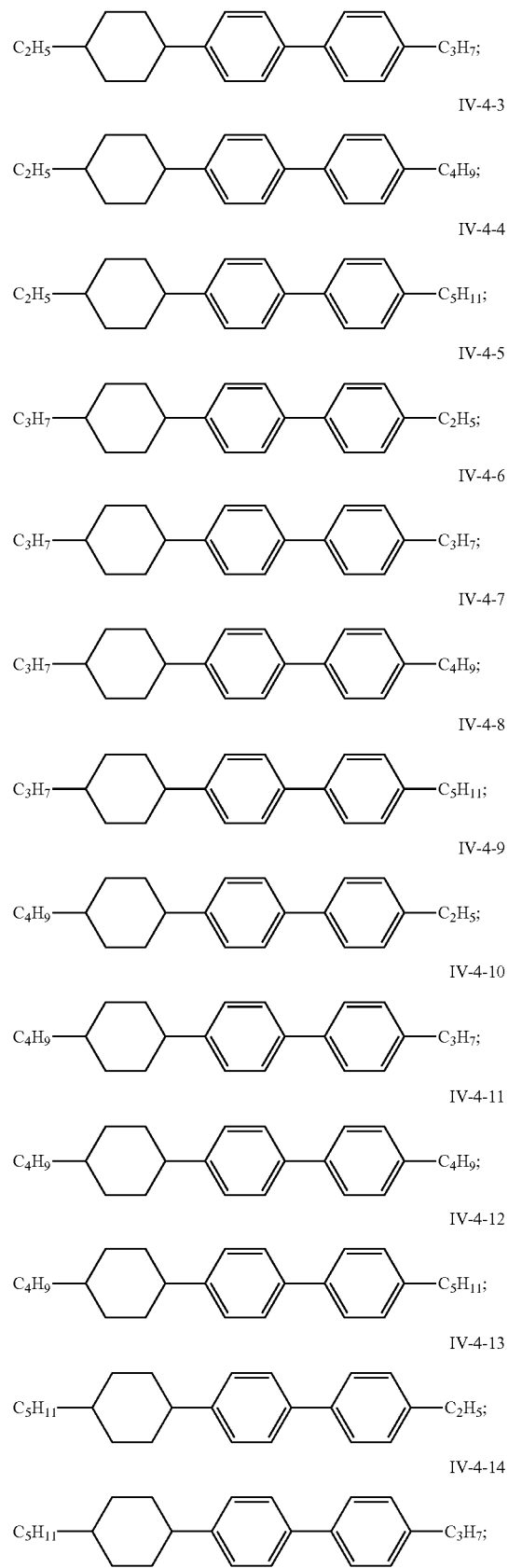

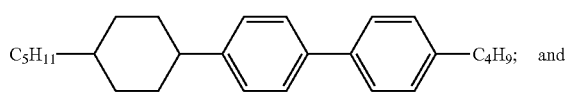

IV-4-15

IV-4-16

In an embodiment of the invention, preferably, the compounds of general formula I account for 5-20% of the total weight of the liquid crystal composition; the compounds of general formula II account for 10-30% of the total weight of the liquid crystal composition; the compounds of general formula III account for 1-10% of the total weight of the liquid crystal composition; the compounds of general formula IV account for 45-75% of the total weight of the liquid crystal composition.

In an embodiment of the invention, more preferably, the compounds of general formula I account for 7-17% of the total weight of the liquid crystal composition; the compounds of general formula II account for 14-25% of the total weight of the liquid crystal composition; the compounds of general formula III account for 4-10% of the total weight of the liquid crystal composition; the compounds of general formula IV account for 49-71% of the total weight of the liquid crystal composition.

Another aspect of the invention provides a liquid crystal display device, preferably an active-matrix-driven liquid crystal display device, which contains the inventive liquid crystal composition.

The invention identifies by comparison the inventive liquid crystal composition having a high specific resistance, high voltage holding ratio, high clear point, suitable optical anisotropy, suitable dielectric anisotropy, small viscosity, low threshold voltage, etc. The inventive liquid crystal composition is suitable for the liquid crystal display device, such that the device has high voltage holding ratio, short response time, high contrast ratio, low power consumption etc., and is environmentally friendly.

Throughout the description, the ratios are weight ratios, the temperatures are in Celsius degrees, and the tests for response time employed test cells with a gap of 7 μm, unless specified otherwise.

DETAILED DESCRIPTION OF THE EMBODIMENTS

The invention will be described in conjunction with embodiments hereinbelow. It should be noted that the following embodiments are merely examples of the invention and intended to illustrate the invention instead of limiting it. Various combinations and modifications may be made to the illustrative embodiment without departing from the spirit or scope of the invention.

To facilitate the description, in the following embodiments, codes listed in table 1 will be used to represent the group structures of the liquid crystal compositions:

TABLE 1

Codes for group structures in liquid crystal compounds

| Unit structure of the group | code | Name of the group |
|---|---|---|
|  | C | 1,4-cyclohexylene |
| 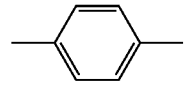 | P | 1,4-phenylene |
| 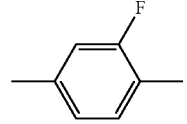 | G | 2-fluoro-1,4-phenylene |
| 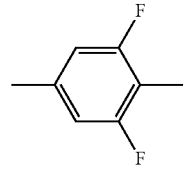 | U | 2,5-difluoro-1,4-phenylene |
| 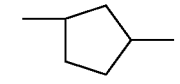 | C(5) | Cyclopentyl |
| 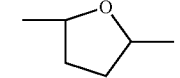 | C(O) | Monooxycyclopentyl |
| 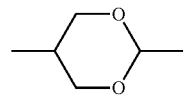 | D | Dioxanyl |
| 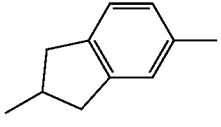 | I | Indenyl |
| —OCF$_3$ | —OCF$_3$ | Trifluoromethoxy |
| —COO— | E | Carboxy |
| —F | F | Fluoro substituent |
| —CF$_2$O— | Q | Difluoromethyleneoxy |
| —O— | O | Oxy substituent |
| —C$_n$H$_{2n+1}$ or —C$_m$H$_{2m+1}$ | n or m | Alkyl |
| —CH=CH— | V | Vinyl |
| —CH$_2$CH$_2$— | 2 | Ethylene |

Take a compound of the following structural formula as an example:

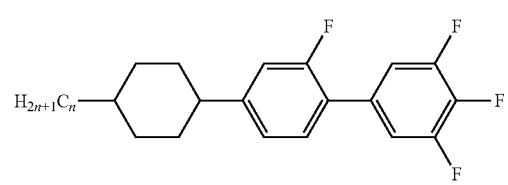

With the codes listed in table 1, the formula may be denoted as: nCGUF, in which n represents the number of carbon atoms in the left alkyl. For example, if n is 2, then the alkyl is —C2H5. C represents cyclohexyl, G represents 2-fluoro-1,4-phenylene, U represents 2,5-difluoro-1,4-phenylene and F represents fluoro substituent.

In the following embodiments, the abbreviated designations for the test subjects are as follows:

Cp: clear point (nematic-isotropic phase transition temperature, °C.)

Δn: optical anisotropy (589 nm, 25° C.)

Δε: dielectric anisotropy (1 KHz, 25° C.)

η: flow viscosity (mm$^2$·s$^{-1}$, 25° C., unless specified otherwise)

$V_{10}$ threshold voltage (the characteristic voltage at relative contrast ratio of 10%)

$t_{30° C.}$ low temperature storage life (at −30° C.)

ρ: specific resistance (25° C., e10·Ω·cm)

VHR (initial): initial voltage holding ratio (%)

VHR (UV): voltage holding ratio after being irradiated with UV light for 20 minutes (%)

VHR (high temperature): voltage holding ratio after being held at 150° C. for 1 h (%)

Wherein, the optical anisotropy was measured with Abbe refractometer, under sodium light source (589 nm), at 25° C.; the test conditions for $V_{10}$: C/1 KHZ, JTSB7.0;

Δε=ε∥−ε⊥, in which, ε∥ is the dielectric constant parallel to the molecular axis, ε⊥ is the dielectric constant perpendicular to the molecular axis, the test conditions: 25° C., 1 KHz, the test cell model TN90, cell gap: 7 μm;

Specific resistance (ρ; measured at 25° C.; Ω, cm)

1.0 ml liquid crystal was injected into the cell and an AC voltage of 10V was applied. The DC current was measured subsequent to having applied the voltage for ten seconds. The specific resistance was calculated.

ρ was calculated according to the following equation:

(specific resistance)={(voltage)×(cell capacity)}/{(DC current)×(dielectric constant in vacuum)}

VHR (initial) was measured with a LC Material Characteristics Measurement System Model 6254; test temperature: 60° C., voltage: 5V, frequency: 6 Hz;

VHR (UV) was measured with the LC Material Characteristics Measurement System Model 6254 following irradiating the liquid crystal with light with a wavelength of 365 nm, an energy of 6000 mJ/cm2 for 20 minutes, test temperature: 60° C., voltage: 5V, frequency: 6 Hz;

VHR (high temperature) was measured with the LC Material Characteristics Measurement System Model 6254, the measurement was conducted after the liquid crystal was held at 150° C. for 1 h, test temperature: 60° C., voltage: 5V, frequency: 6 Hz;

The components employed in the following embodiments may be synthesized via known methods or commercially available. The synthesis techniques are conventional and the resultant liquid crystal compounds comply with the related standards.

Liquid crystal compositions were prepared according to the formulas specified in the following embodiments. The preparations were conducted according to the conventional methods of the art, such as mixing the ingredients in specified proportion by heating, supersonic, suspension, etc.

The liquid crystal compositions of the following embodiments were prepared and studied. The compositions and properties of the liquid crystal compositions are illustrated below.

Comparative Example 1

The liquid crystal composition of Comparative Example 1 was prepared as per the compounds and their respective weight percentages listed in table 2. The liquid crystal composition was injected between the liquid crystal display substrates and tests were conducted. The test results are as follows:

TABLE 2

Formulation of liquid crystal composition and performances tested

| Code of component | Content, % | Test result of performance parameters | |
|---|---|---|---|
| 3CPO2 | 2.5 | Cp | 88 |
| 5CPUF | 2 | Δn | 0.096 |
| 3CPP2 | 6 | Δε | 7.1 |
| 2CCUF | 11.5 | η | 23 |
| 3CCUF | 11 | $V_{10}$ | 1.56 |
| 3PGP2 | 5 | $t_{-30° C.}$ | <400 h |
| 3CCGF | 5 | VHR (initial) | 93 |
| 5CCGF | 5.5 | VHR (UV) | 90 |
| 2CCPUF | 3.5 | VHR (high temperature) | 94 |
| 3CCPUF | 4 | ρ | 4000 |
| 3CCV1 | 8 | | |
| 3CCV | 26 | | |
| 3CCEPC4 | 5 | | |
| 3CCEPC5 | 5 | | |
| Total | 100 | | |

Comparative Example 2

The liquid crystal composition of Comparative Example 2 was prepared as per the compounds and their respective weight percentages listed in table 3. The liquid crystal composition was injected between the liquid crystal display substrates and tests were conducted. The test results are as follows:

TABLE 3

Formulation of liquid crystal composition and performances tested

| Code of component | Content, % | Test result of performance parameters | |
|---|---|---|---|
| 3CPUF | 2 | Cp | 85 |
| 2CCUF | 6 | Δn | 0.095 |
| 3CCUF | 8 | Δε | 7.3 |
| 3CCQUF | 16 | η | 21 |
| VCCP1 | 3 | $V_{10}$ | 1.52 |
| 3CCV | 2 | $t_{-30° C.}$ | <400 h |
| 3PUQUF | 19 | VHR (initial) | 95 |
| 3CCEPC3 | 4 | VHR (UV) | 91 |
| 3CCEPC4 | 3 | VHR (high temperature) | 96 |
| 2CCPOCF$_3$ | 10 | ρ | 5000 |
| 3CCPOCF$_3$ | 10 | | |
| 2CCQUF | 14 | | |
| 2PGP3 | 3 | | |
| Total | 100 | | |

Example 1

The liquid crystal composition of Example 1 was prepared as per the compounds and their respective weight percentages listed in table 4. The liquid crystal composition was injected between the liquid crystal display substrates and tests were conducted. The test results are as follows:

TABLE 4

Formulation of liquid crystal composition and performances tested

| Code of component | Code of structure | Content, % | Test result of performance parameters | |
|---|---|---|---|---|
| 3PGPC2 | / | 3 | Cp | 90 |
| 3PGP2 | III-3-1 | 4 | $\Delta n$ | 0.111 |
| 1PGP2V | III-1-5 | 3 | $\Delta \varepsilon$ | 8 |
| 3CCV2F | / | 8 | $\eta$ | 14 |
| VCCP1 | IV-3-1 | 8 | $V_{10}$ | 1.35 |
| 3CPP2 | IV-4-5 | 5 | $t_{-30° C.}$ | >500 h |
| 3CPO2 | IV-2-18 | 6 | VHR (initial) | 98 |
| 3CCV | IV-1-12 | 32 | VHR (UV) | 94 |
| 3CCV1 | IV-1-16 | 8 | VHR (high temperature) | 97.5 |
| 2IPGQUF | II-10-1 | 4 | $\rho$ | 12000 |
| 3PUQUF | II-5-2 | 5 | | |
| 5PGUQUF | II-8-4 | 5 | | |
| 3PGUQPCF$_3$ | I A-3 | 4 | | |
| 4PGUQPCF$_3$ | I A-4 | 5 | | |
| Total | | 100 | | |

Example 2

The liquid crystal composition of Example 2 was prepared as per the compounds and their respective weight percentages listed in table 5. The liquid crystal composition was injected between the liquid crystal display substrates and tests were conducted. The test results are as follows:

TABLE 5

Formulation of liquid crystal composition and performances tested

| Code of component | Code of structure | Content, % | Test result of performance parameters | |
|---|---|---|---|---|
| 3PGPC2 | / | 3 | Cp | 93 |
| VCCP1 | IV-3-1 | 8 | $\Delta n$ | 0.113 |
| 3CPP2 | IV-4-5 | 5 | $\Delta \varepsilon$ | 7.9 |
| 3CPO2 | IV-2-18 | 6 | $\eta$ | 13 |
| 3PGP2 | III-3-1 | 4 | $V_{10}$ | 1.36 |
| 3PGP4 | III-3-3 | 4 | $t_{-30° C.}$ | >500 h |
| 3CCV | IV-1-12 | 30 | VHR (initial) | 97 |
| 3CCV1 | IV-1-16 | 11 | VHR (UV) | 93 |
| 3CCQUF | II-1-2 | 5 | VHR (high temperature) | 96 |
| 2IPUQUF | II-11-1 | 5 | $\rho$ | 15000 |
| 4IPGUQUF | II-13-3 | 6 | | |
| 5IPGUQUF | II-13-4 | 2 | | |
| 3DCQUF | II-3-2 | 2 | | |
| 3PGUQPCF$_3$ | I A-3 | 4 | | |
| 4PGUQPCF$_3$ | I A-4 | 5 | | |
| Total | | 100 | | |

Example 3

The liquid crystal composition of Example 3 was prepared as per the compounds and their respective weight percentages listed in table 6. The liquid crystal composition was injected between the liquid crystal display substrates and tests were conducted. The test results are as follows:

TABLE 6

Formulation of liquid crystal composition and performances tested

| Code of component | Code of structure | Content, % | Test result of performance parameters | |
|---|---|---|---|---|
| 3PGP2 | III-3-1 | 2 | Cp | 92 |
| 3PGP4 | III-3-3 | 5 | $\Delta n$ | 0.109 |
| 3CCP2 | IV-3-9 | 5 | $\Delta \varepsilon$ | 8.5 |
| 3CPO2 | IV-2-18 | 6 | $\eta$ | 12 |
| VCCP1 | IV-3-1 | 6 | $V_{10}$ | 1.31 |
| 2CPP3 | IV-4-2 | 6 | $t_{-30° C.}$ | >500 h |
| 3CCV | IV-1-12 | 30 | VHR (initial) | 98 |
| 3CCV1 | IV-1-16 | 11 | VHR (UV) | 95 |
| 3IPUQUF | II-11-2 | 5 | VHR (high temperature) | 97 |
| 2IPUQUF | II-11-1 | 5 | $\rho$ | 14000 |
| 3PGUQUF | II-8-2 | 6 | | |
| 4PGUQUF | II-8-3 | 2 | | |
| 5PGUQUF | II-8-4 | 2 | | |
| 3PGUQPOCF$_3$ | I B-3 | 4 | | |
| 2PGUQPOCF$_3$ | I B-2 | 5 | | |
| Total | | 100 | | |

Example 4

The liquid crystal composition of Example 4 was prepared as per the compounds and their respective weight percentages listed in table 7. The liquid crystal composition was injected between the liquid crystal display substrates and tests were conducted. The test results are as follows:

TABLE 7

Formulation of liquid crystal composition and performances tested

| Code of component | Code of structure | Content, % | Test result of performance parameters | |
|---|---|---|---|---|
| 3CPO2 | IV-2-18 | 15 | Cp | 90 |
| 3CCP1 | IV-3-8 | 3 | $\Delta n$ | 0.108 |
| 3PGP2 | III-3-1 | 2 | $\Delta \varepsilon$ | 7.8 |
| 3PGP4 | III-3-3 | 2 | $\eta$ | 11 |
| VCCP1 | IV-3-1 | 6 | $V_{10}$ | 1.41 |
| 3CCV | IV-1-12 | 36 | $t_{-30° C.}$ | >500 h |
| 3CCV1 | IV-1-16 | 11 | VHR (initial) | 98 |
| 3IPUQUF | II-11-2 | 5 | VHR (UV) | 93 |
| 2IPUQUF | II-11-1 | 5 | VHR (high temperature) | 97 |
| 3DCQUF | II-3-2 | 4 | $\rho$ | 17000 |
| 4DUQUF | II-4-3 | 4 | | |
| 3PGUQPOCF$_3$ | I B-3 | 5 | | |
| 2PGUQPOCF$_3$ | I B-2 | 2 | | |
| Total | | 100 | | |

Example 5

The liquid crystal composition of Example 5 was prepared as per the compounds and their respective weight percentages listed in table 8. The liquid crystal composition was injected between the liquid crystal display substrates and tests were conducted. The test results are as follows:

TABLE 8

Formulation of liquid crystal composition and performances tested

| Code of component | Code of structure | Content, % | Test result of performance parameters | |
|---|---|---|---|---|
| 3PGP2 | III-3-1 | 5 | Cp | 93 |
| 3PGP4 | III-3-3 | 5 | $\Delta n$ | 0.109 |
| 3CPP2 | IV-4-5 | 6 | $\Delta\varepsilon$ | 7.9 |
| 3CPP4 | IV-4-7 | 6 | $\eta$ | 12 |
| 3CP2 | IV-2-5 | 3 | $V_{10}$ | 1.38 |
| VCCP1 | IV-3-1 | 7 | $t_{-30°\,C.}$ | >500 h |
| 3CCV | IV-1-12 | 35 | VHR (initial) | 98 |
| 3CPO1 | IV-2-14 | 5 | VHR (UV) | 94 |
| 2IPUQUF | II-11-1 | 6 | VHR (high temperature) | 97 |
| 3IPGUQUF | II-13-2 | 6 | $\rho$ | 15000 |
| 3DCQUF | II-3-2 | 3 | | |
| 4DUQUF | II-4-3 | 3 | | |
| 3PGUQPOCF$_3$ | I B-3 | 5 | | |
| 3PGUQPCF$_3$ | I A-3 | 5 | | |
| Total | | 100 | | |

Example 6

The liquid crystal composition of Example 6 was prepared as per the compounds and their respective weight percentages listed in table 9. The liquid crystal composition was injected between the liquid crystal display substrates and tests were conducted. The test results are as follows:

TABLE 9

Formulation of liquid crystal composition and performances tested

| Code of component | Code of structure | Content, % | Test result of performance parameters | |
|---|---|---|---|---|
| 3PGP2 | III-3-1 | 4 | Cp | 93 |
| 3PGP4 | III-3-3 | 5 | $\Delta n$ | 0.113 |
| VCCP1 | IV-3-1 | 10 | $\Delta\varepsilon$ | 8.4 |
| 3CCV | IV-1-12 | 35 | $\eta$ | 13 |
| 3IPUQUF | II-11-2 | 5 | $V_{10}$ | 1.3 |
| 2IPGUQUF | II-13-1 | 5 | $t_{-30°\,C.}$ | >500 h |
| 3PUQUF | II-5-2 | 6 | VHR (initial) | 97 |
| 3CCQUF | II-1-2 | 6 | VHR (UV) | 94 |
| 4DUQUF | II-4-3 | 3 | VHR (high temperature) | 97.5 |
| 3CC2 | IV-1-2 | 4 | $\rho$ | 13000 |
| 2PGUQPOCF$_3$ | I B-2 | 4 | | |
| 3PGUQPOCF$_3$ | I B-3 | 4 | | |
| 2PGUQPCF$_3$ | I A-2 | 4 | | |
| 3PGUQPCF$_3$ | I A-3 | 5 | | |
| Total | | 100 | | |

Example 7

The liquid crystal composition of Example 7 was prepared as per the compounds and their respective weight percentages listed in table 10. The liquid crystal composition was injected between the liquid crystal display substrates and tests were conducted. The test results are as follows:

TABLE 10

Formulation of liquid crystal composition and performances tested

| Code of component | Code of structure | Content, % | Test result of performance parameters | |
|---|---|---|---|---|
| 3PGP2 | III-3-1 | 3 | Cp | 92 |
| 3PGP4 | III-3-3 | 3 | $\Delta n$ | 0.114 |
| VCCP1 | IV-3-1 | 12 | $\Delta\varepsilon$ | 8.5 |
| 3CCV | IV-1-12 | 35 | $\eta$ | 12 |
| 3C(5)CCQUF | II-6-3 | 4 | $V_{10}$ | 1.27 |
| 3C(O)PUQUF | II-7-3 | 4 | $t_{-30°\,C.}$ | >500 h |
| 3PUQUF | II-5-2 | 8 | VHR (initial) | 96.5 |
| 3CCQUF | II-1-2 | 7 | VHR (UV) | 93.5 |
| 4DUQUF | II-4-3 | 4 | VHR (high temperature) | 97 |
| 3CC2 | IV-1-2 | 5 | $\rho$ | 15000 |
| 2PGUQPOCF$_3$ | I B-2 | 5 | | |
| 3PGUQPOCF$_3$ | I B-3 | 3 | | |
| 2PGUQPCF$_3$ | I A-2 | 3 | | |
| 3PGUQPCF$_3$ | I A-3 | 4 | | |
| Total | | 100 | | |

To achieve the environmental friendliness, the invention forgoes the chlorine monomer for difluoroether monomers which have improved voltage holding ratio relative to ordinary medium-polarity monomers. As shown by the comparison between the Examples and the Comparative Examples, the inventive liquid crystal composition has a large specific resistance, a high clear point, a suitable optical anisotropy, a suitable dielectric anisotropy, a small viscosity, an improved low temperature storage stability, and is suitable for display device, enabling better voltage holding ratio, better display contrast ratio, fast response, lower power consumption.

The embodiments described above are merely descriptive of the concept and characteristics of the invention such that those skilled in the art may practice the invention, and are not intended to limit the scope of the invention. It is therefore intended that the following claims cover all equivalent modifications and variations as fall within the scope of this invention.

What is claimed is:

1. A liquid crystal composition, comprising:
   one or more compounds of general formula I accounting for 5-30% of the total weight of the liquid crystal composition

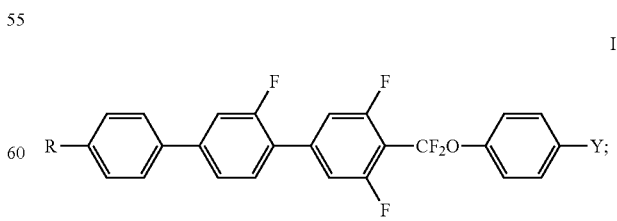

one or more compounds of general formula II accounting for 1-30% of the total weight of the liquid crystal composition

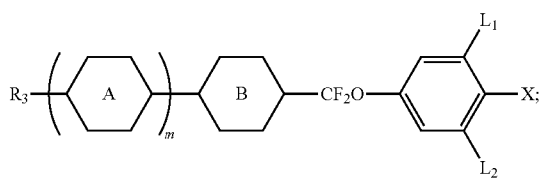

one or more compounds of general formula III accounting for 1-20% of the total weight of the liquid crystal composition

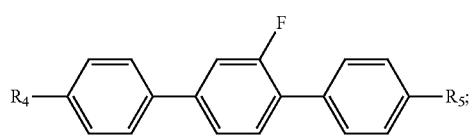

and
one or more compounds of general formula IV accounting for 30-80% of the total weight of the liquid crystal composition

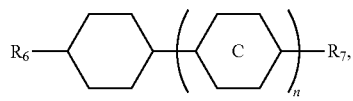

wherein,

R, $R_4$, $R_5$, $R_6$ and $R_7$ are the same or different, and each independently represents an alkyl having 1-7 carbon atoms, an alkoxy having 1-7 carbon atoms or an alkenyl having 2-7 carbon atoms;

$R_3$ represents H, an alkyl having 1-7 carbon atoms, an alkoxy having 1-7 carbon atoms or an alkenyl having 2-7 carbon atoms;

ring

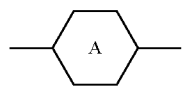

represents

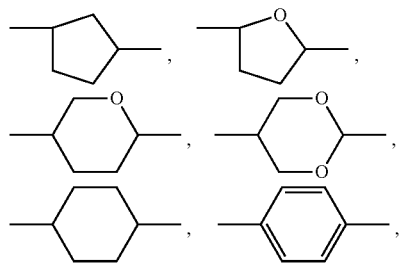

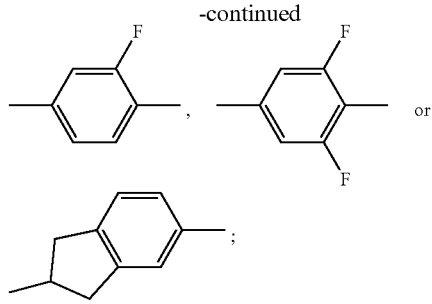

ring

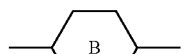

and ring

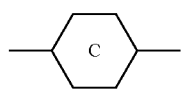

are the same or different, and each independently represents

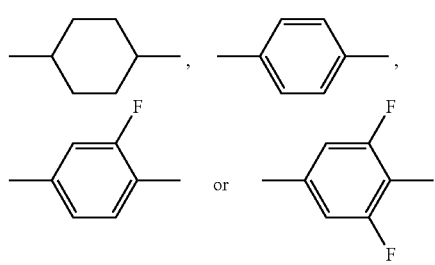

Y represents —$CF_3$ or —$OCF_3$;
X represents F or —$OCF_2$—$CF$=$CF_2$;
$L_1$ and $L_2$ are the same or different, and each independently represents —H or —F;
m represents 1, 2 or 3;
n represents 1 or 2;
when m is 2 or 3, rings

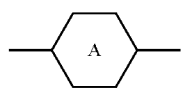

may be the same or different, and each independently represents

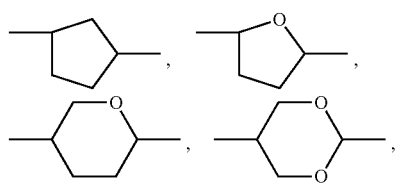

-continued

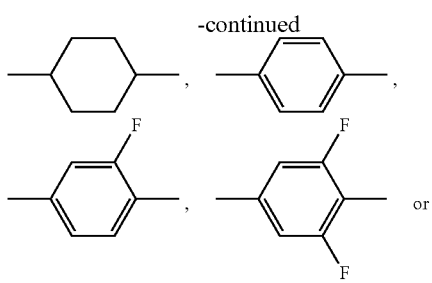

when n is 2, rings

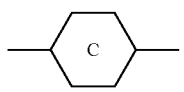

may be the same or different, and each independently represents

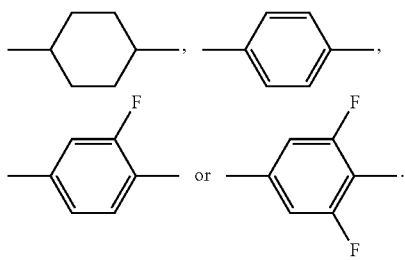

2. The liquid crystal composition according to claim 1, wherein the compounds of general formula I are selected from the group consisting of the following compounds:

IA

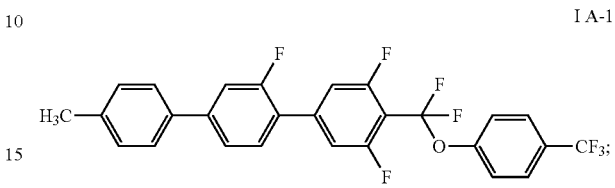

IB

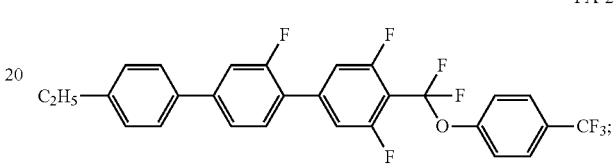

wherein,
R$_1$, R$_2$ are the same or different, and each independently represents an alkyl having 1-7 carbon atoms or an alkoxy having 1-7 carbon atoms.

3. The liquid crystal composition according to claim 2, wherein the compounds of general formula IA account for 5-30% of the total weight of the liquid crystal composition.

4. The liquid crystal composition according to claim 2, wherein the compounds of general formula IB account for 5-30% of the total weight of the liquid crystal composition.

5. The liquid crystal composition according to claim 2, wherein the compounds of general formula IA are selected from the group consisting of:

IA-1

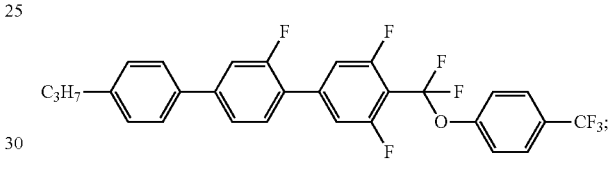

IA-2

IA-3

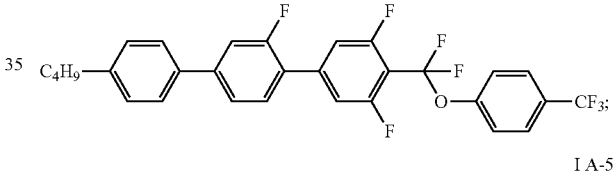

IA-4

IA-5

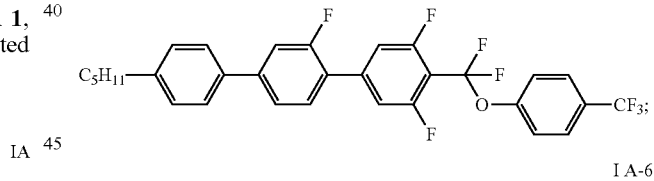

IA-6

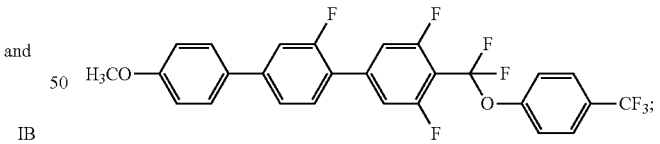

IA-7

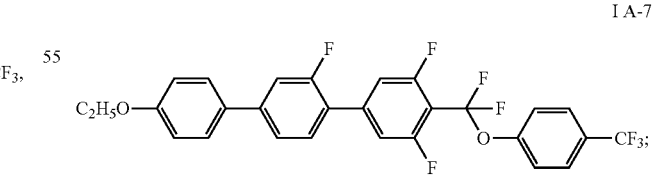

IA-8

and

IA-9
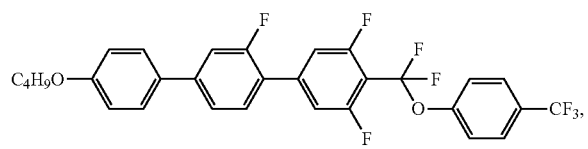
the compounds of general formula IB are selected from the group consisting of:
IB-1
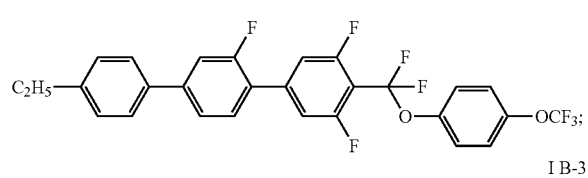
IB-2
IB-3
IB-4
IB-5
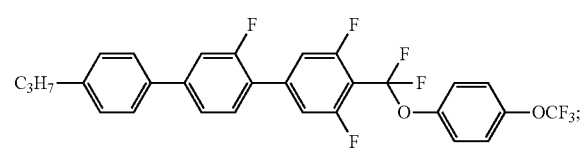
IB-6
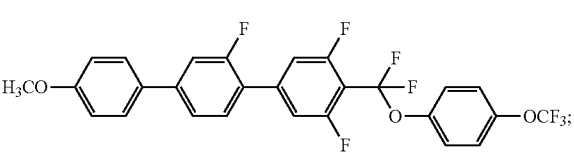
IB-7
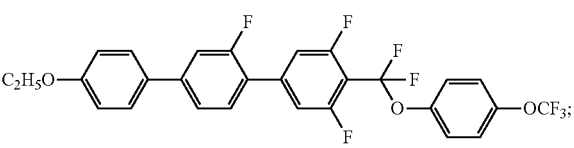
IB-8
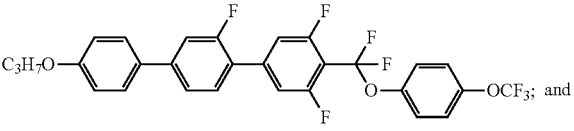
IB-9
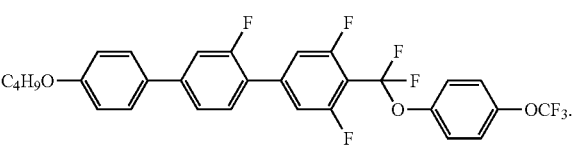
6. The liquid crystal composition according to claim 1, wherein the compounds of general formula II are selected from the group consisting of:
II-1
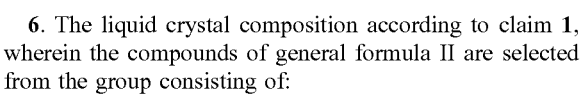
II-2
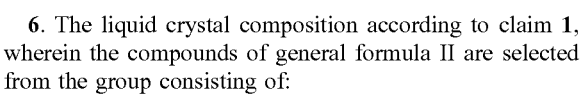
II-3
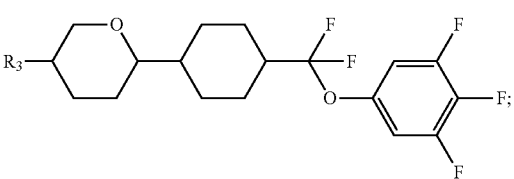
II-4
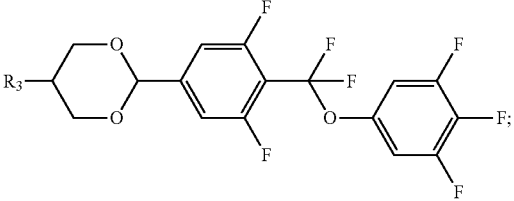

-continued
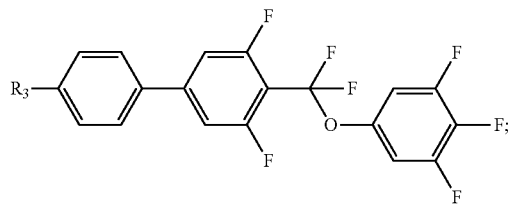
II-5
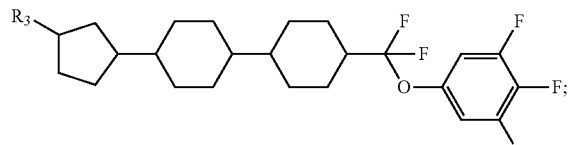
II-6
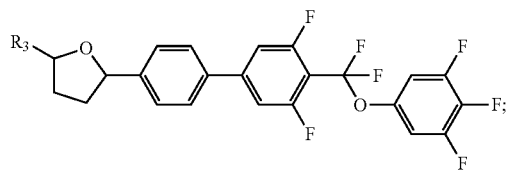
II-7
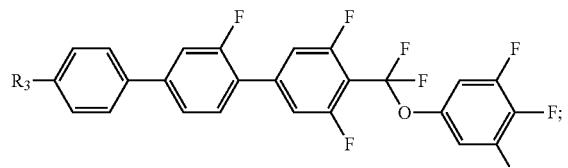
II-8
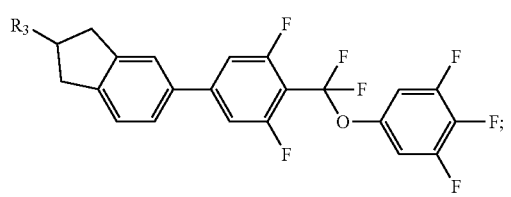
II-9
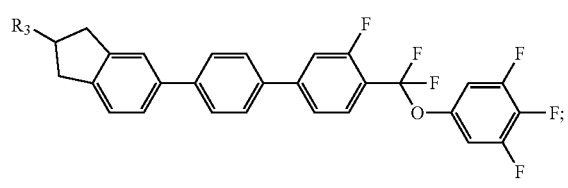
II-10
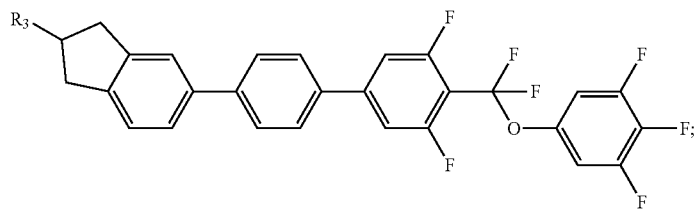
II-11
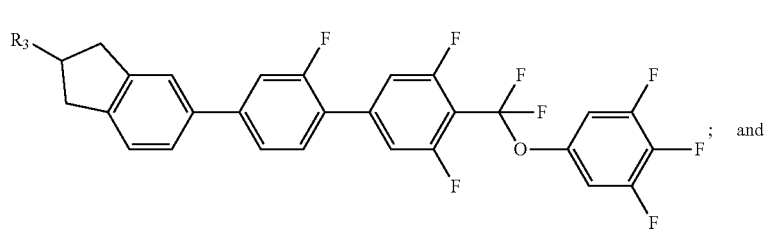
II-12
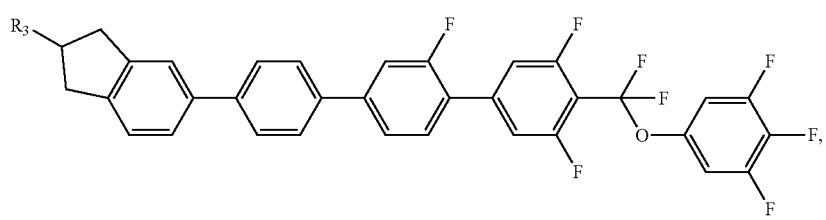
II-13
wherein,
R₃ represents H, an alkyl having 1-7 carbon atoms or an alkoxy having 1-7 carbon atoms.
7. The liquid crystal composition according to claim 6, wherein the compounds of general formula II-1 are selected from the group consisting of:
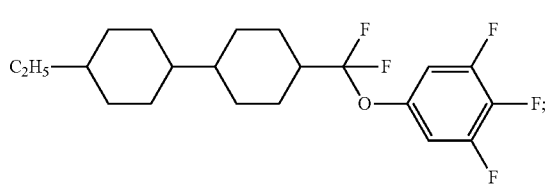
II-1-1

-continued
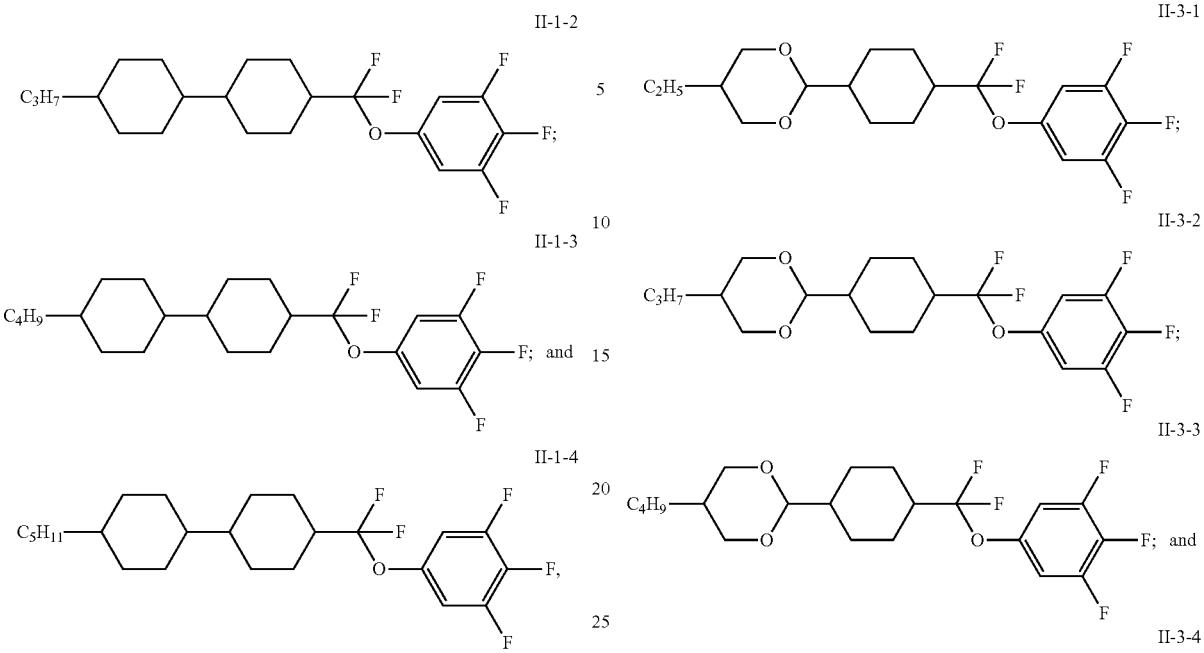
the compounds of general formula II-2 are selected from the group consisting of:
the compounds of general formula II-3 are selected from the group consisting of:
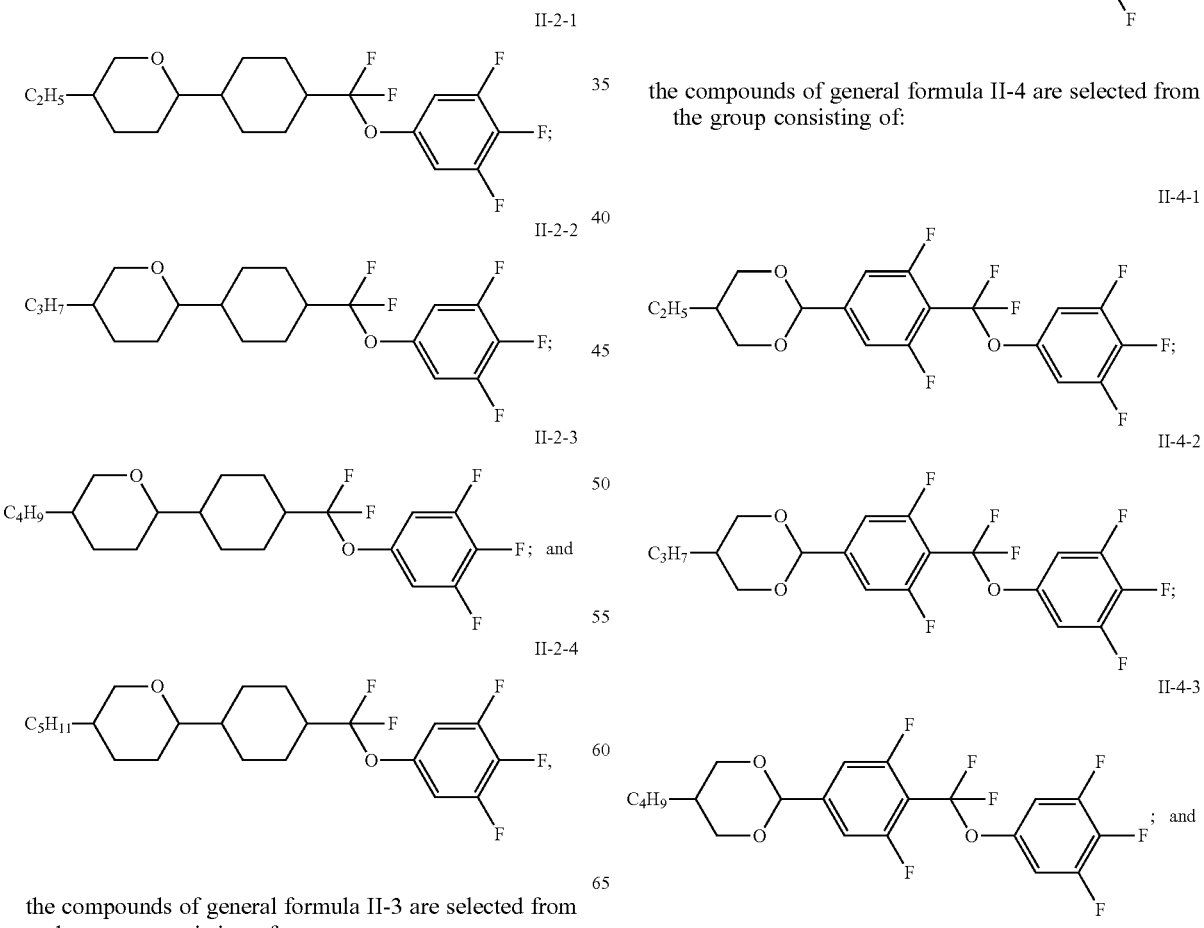
the compounds of general formula II-4 are selected from the group consisting of:

II-4-4
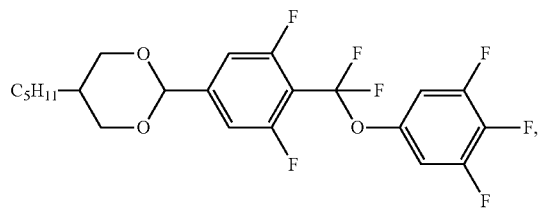
the compounds of general formula II-5 are selected from the group consisting of:
II-5-1
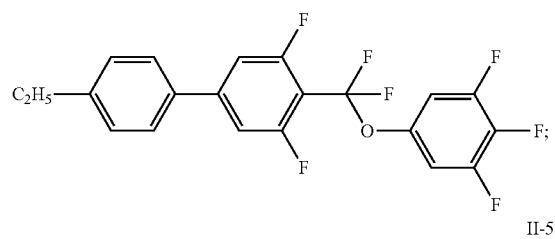
II-5-2
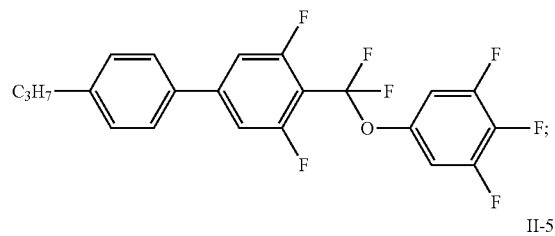
II-5-3
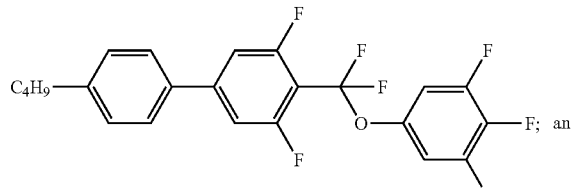
II-5-4
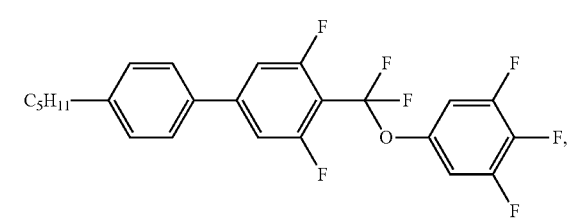
the compounds of general formula II-6 are selected from the group consisting of:
II-6-1
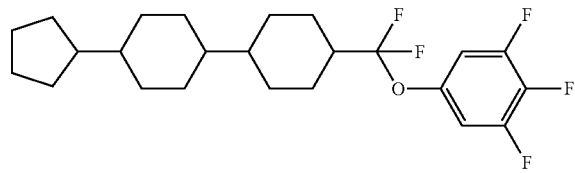
II-6-2
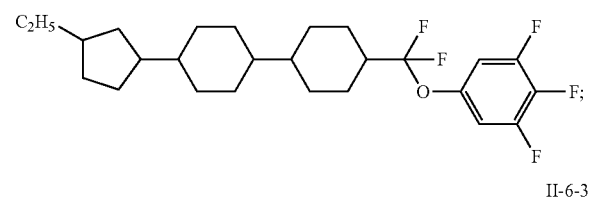
II-6-3
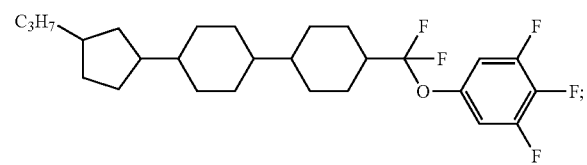
II-6-4
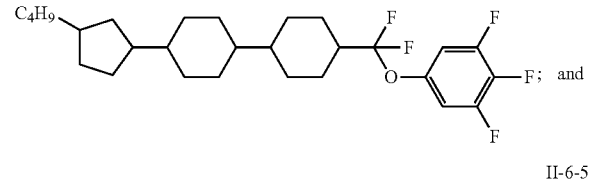
II-6-5
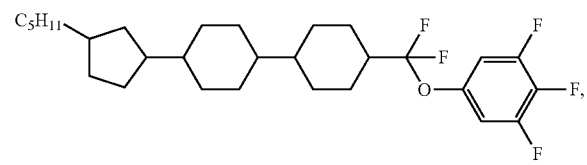
the compounds of general formula II-7 are selected from the group consisting of:
II-7-1
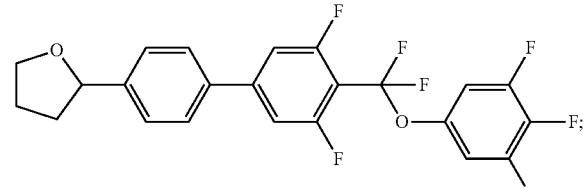
II-7-2
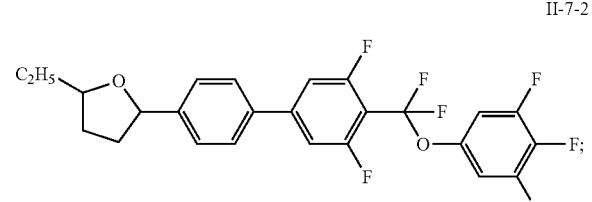
II-7-3
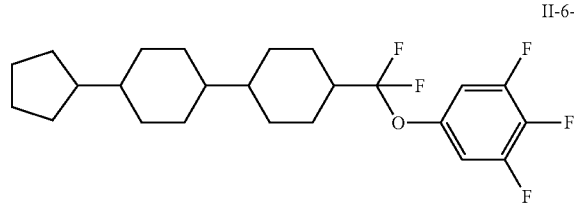

II-7-4
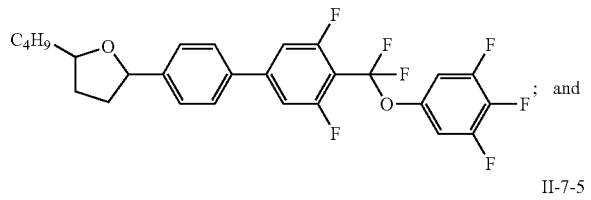
; and
II-7-5
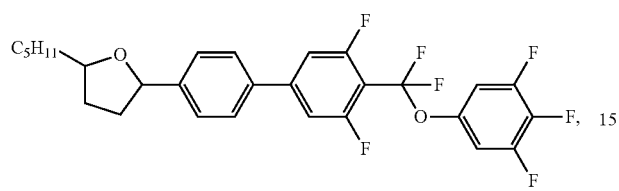
,
the compounds of general formula II-8 are selected from the group consisting of:
II-8-1
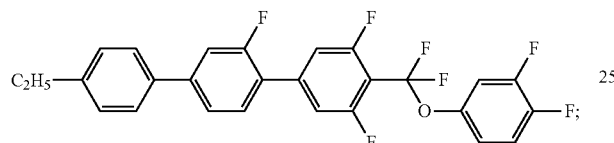
;
II-8-2
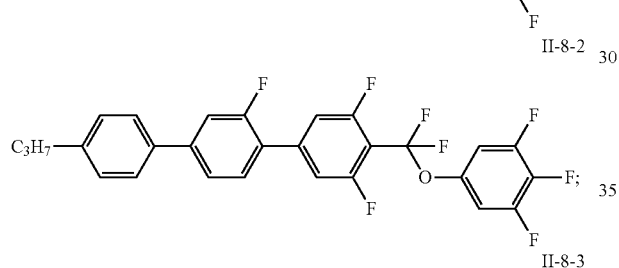
;
II-8-3
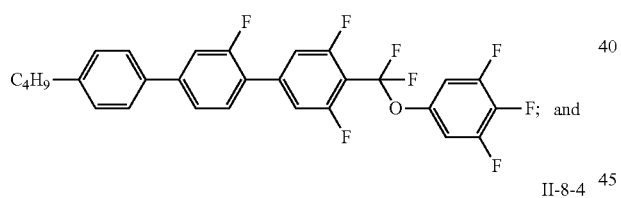
; and
II-8-4
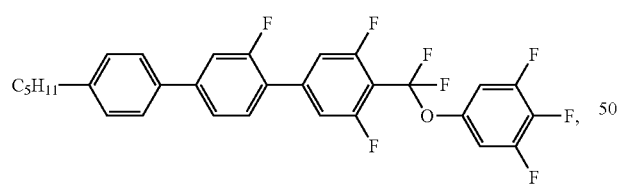
,
the compounds of general formula II-9 are selected from the group consisting of:
II-9-1
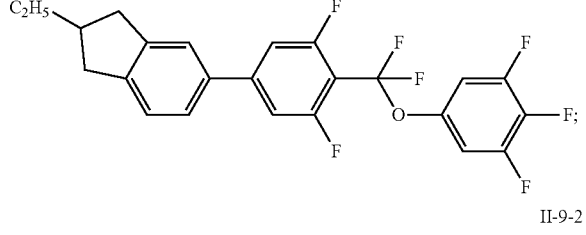
;
II-9-2
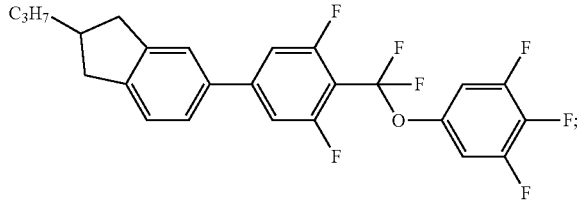
;
II-9-3
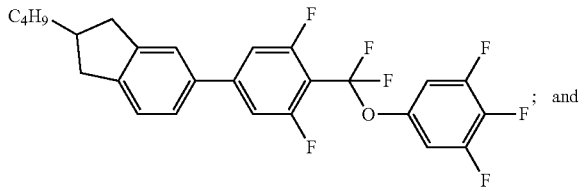
; and
II-9-4
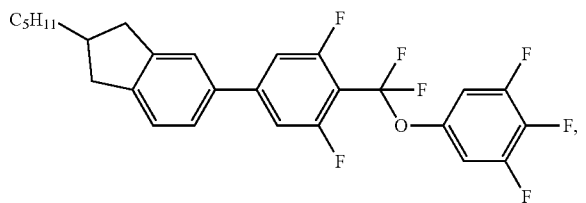
,
the compounds of general formula II-10 are selected from the group consisting of:
II-10-1
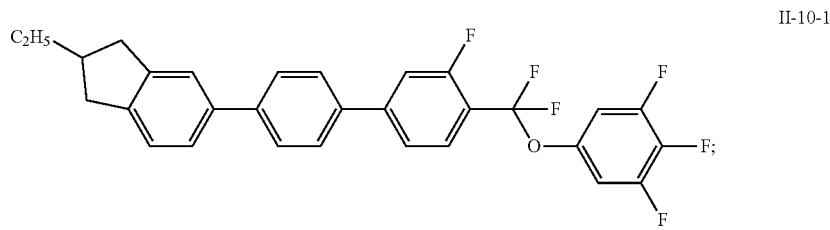
;

II-10-2
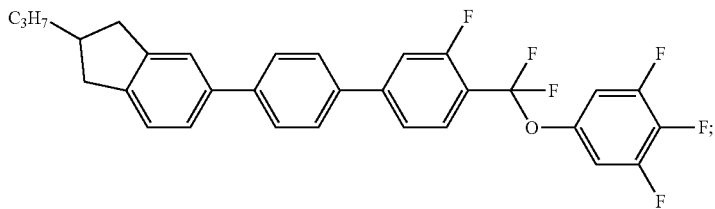
II-10-3
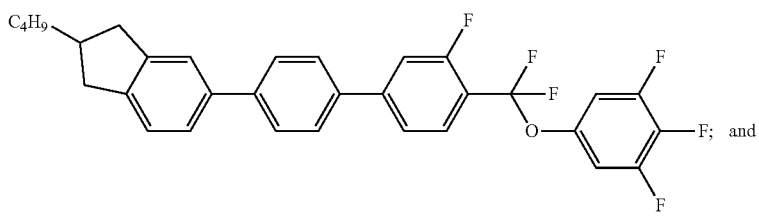
and
II-10-4
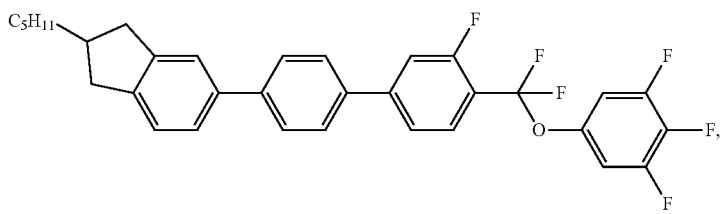
,
the compounds of general formula II-11 are selected from the group consisting of:
II-11-1
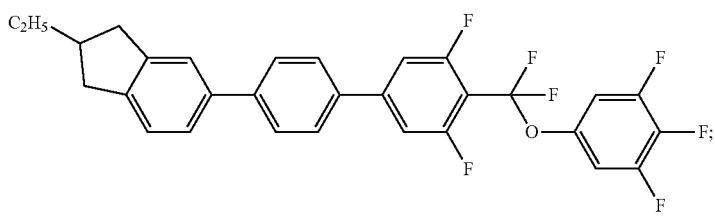
II-11-2
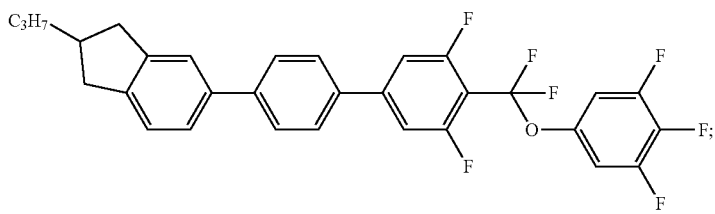
II-11-3
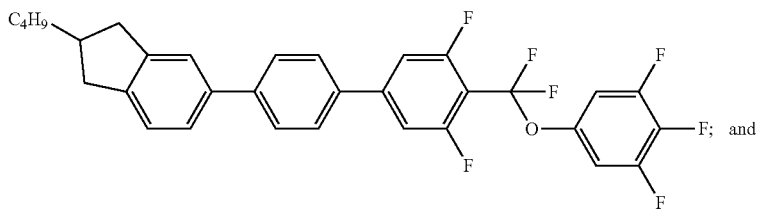
and II-11-4
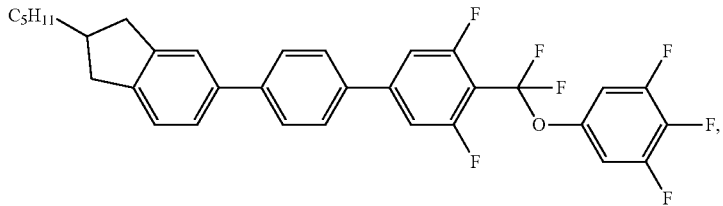
the compounds of general formula II-12 are selected from the group consisting of:
II-12-1
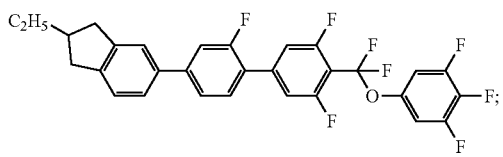
II-12-2
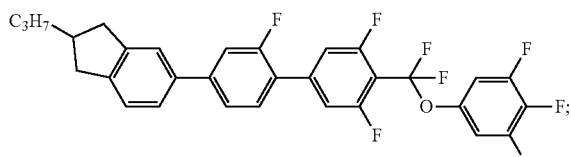
II-12-3
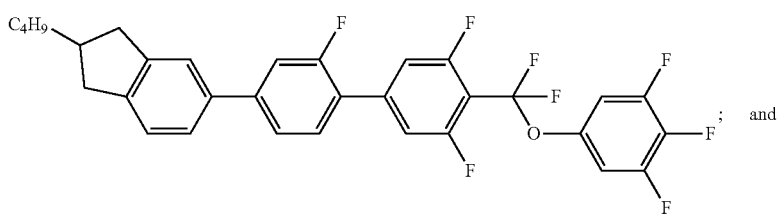
; and
II-12-4
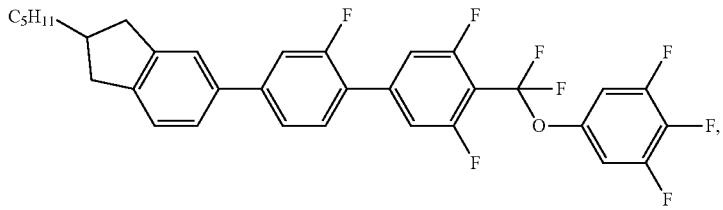
the compounds of general formula II-13 are selected from the group consisting of:
II-13-1
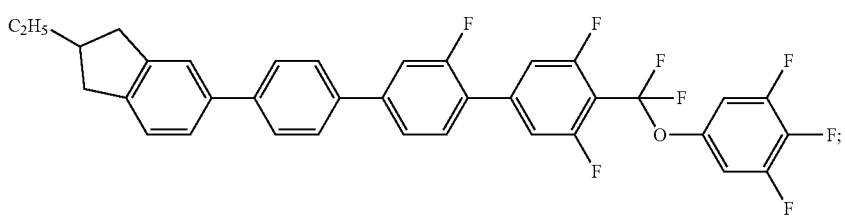
II-13-2
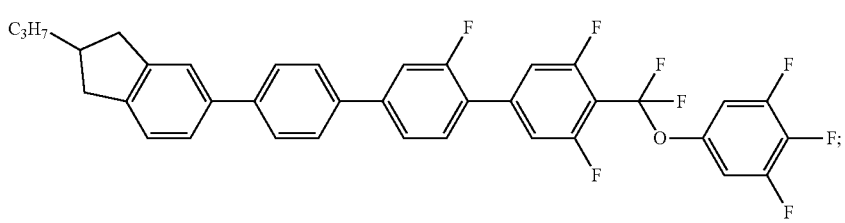

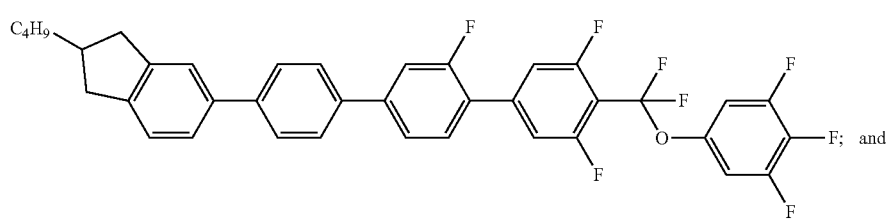

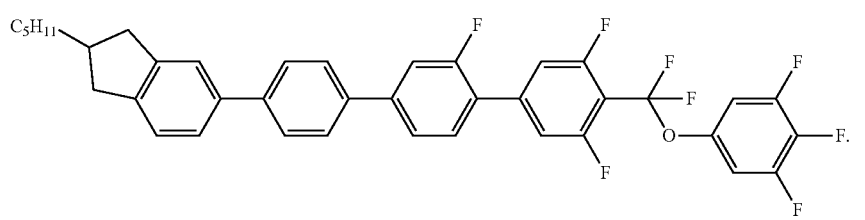

8. The liquid crystal composition according to claim 1, wherein the compounds of general formula III are selected from the group consisting of:

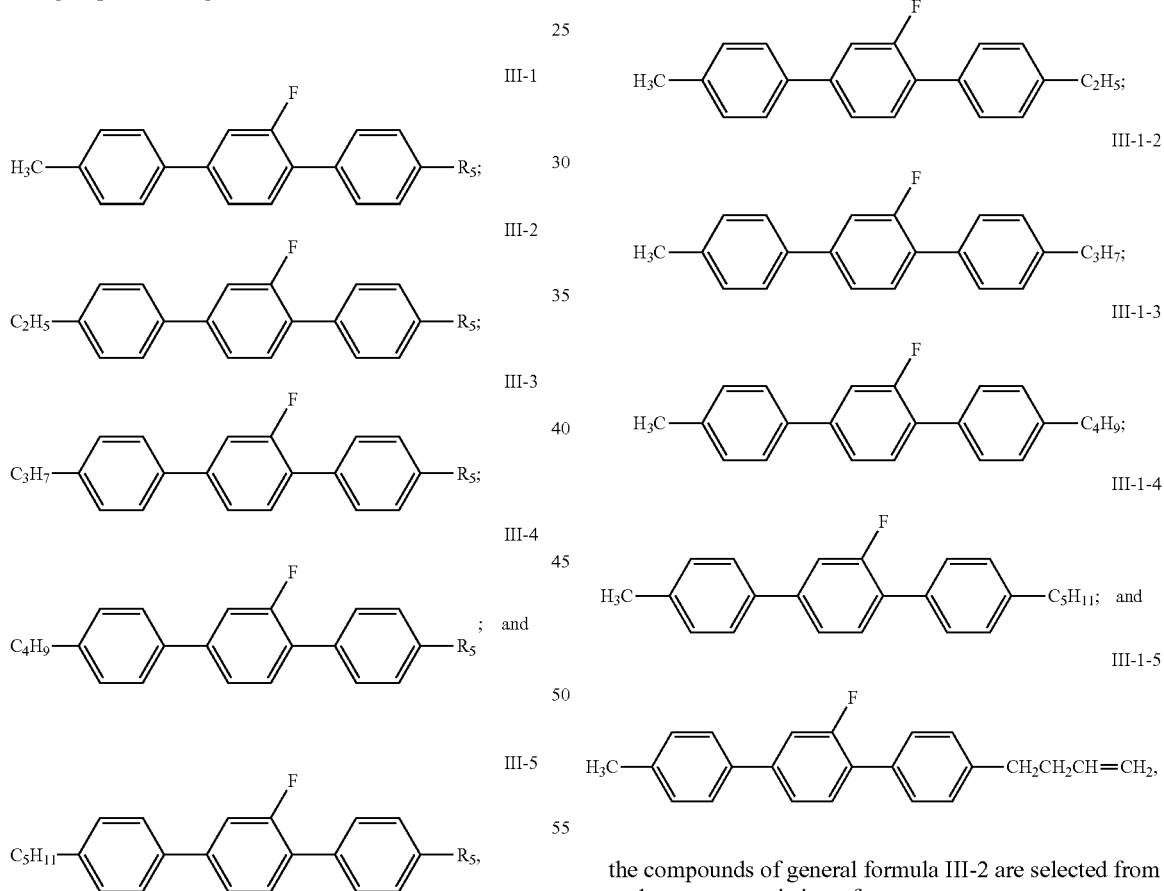

wherein, $R_5$ represents an alkyl having 1-5 carbon atoms or an alkenyl having 2-5 carbon atoms.

9. The liquid crystal composition according to claim 8, wherein the compounds of general formula III-1 are selected from the group consisting of:

the compounds of general formula III-2 are selected from the group consisting of:

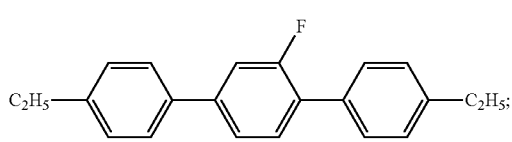

-continued

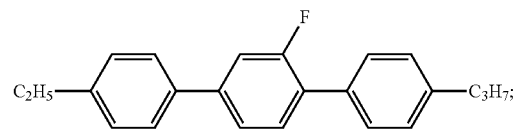
III-2-2

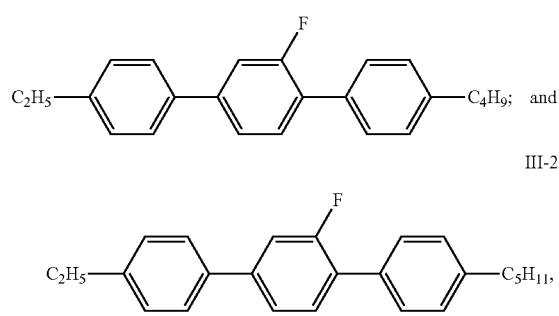
III-2-3

III-2-4 the compounds of general formula III-3 are selected from the group consisting of:

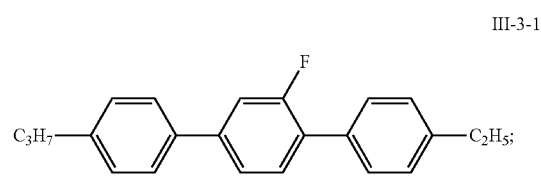
III-3-1

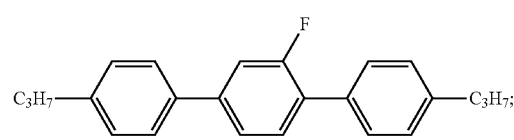
III-3-2

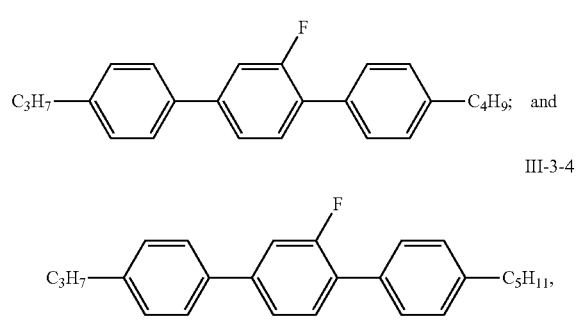
III-3-3

III-3-4 the compounds of general formula III-4 are selected from the group consisting of:

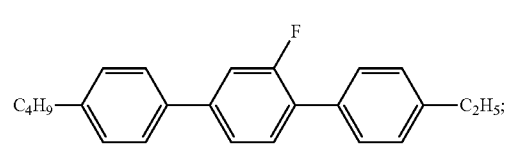
III-4-1

-continued

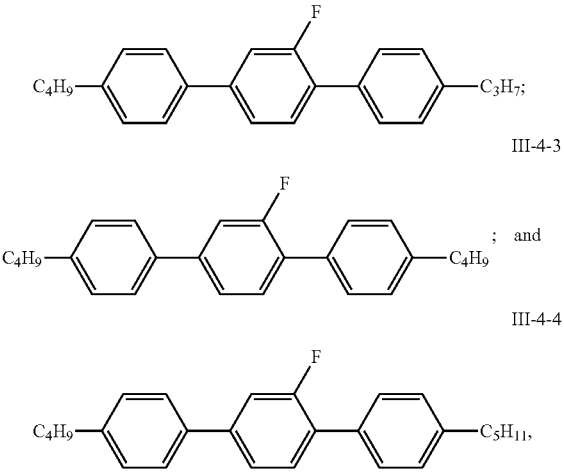
III-4-2

III-4-3

III-4-4 the compounds of general formula III-5 are selected from the group consisting of:

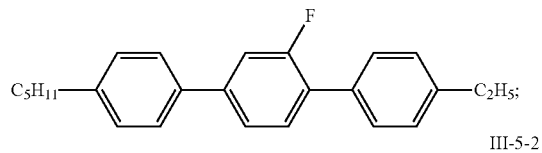
III-5-1

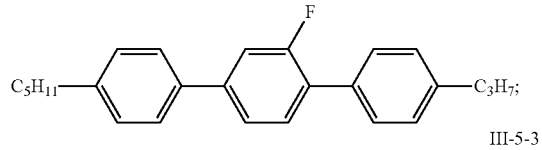
III-5-2

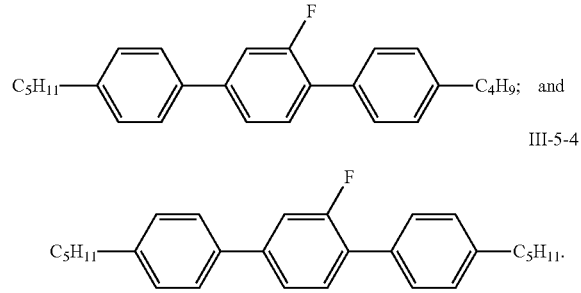
III-5-3

III-5-4

10. The liquid crystal composition according to claim 1, wherein the compounds of general formula IV are selected from the group consisting of:

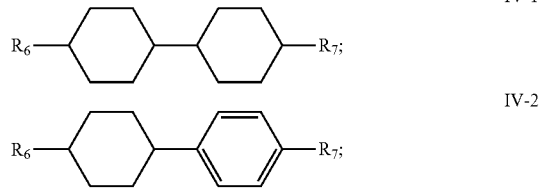
IV-1

IV-2

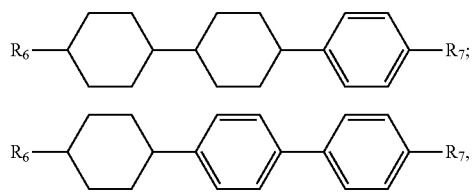

wherein,

R$_6$ and R$_7$ are the same or different, and each independently represents an alkyl having 1-7 carbon atoms, an alkoxy having 1-7 carbon atoms or an alkenyl having 2-7 carbon atoms.

11. The liquid crystal composition according to claim 10, wherein the compounds of general formula IV-1 are selected from the group consisting of:

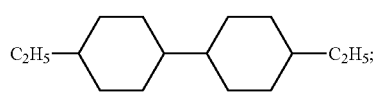

IV-1-1

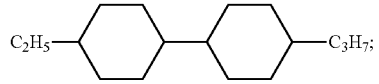

IV-1-2

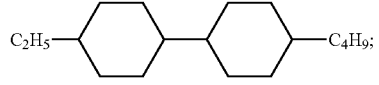

IV-1-3

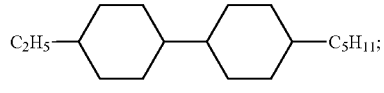

IV-1-4

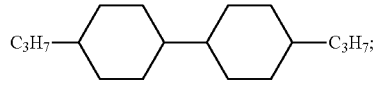

IV-1-5

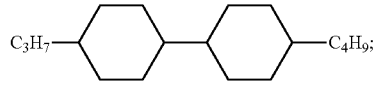

IV-1-6

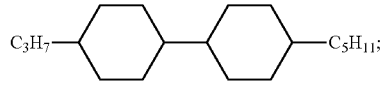

IV-1-7

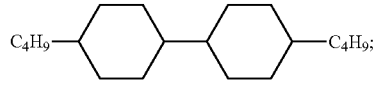

IV-1-8

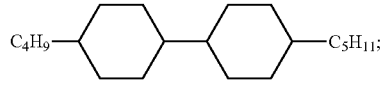

IV-1-9

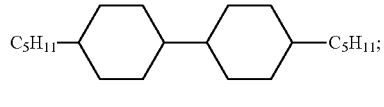

IV-1-10

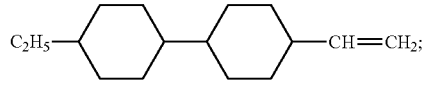

IV-1-11

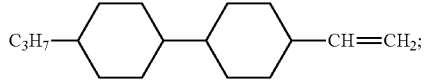

IV-1-12

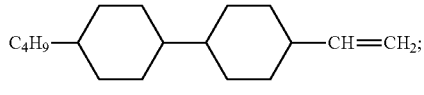

IV-1-13

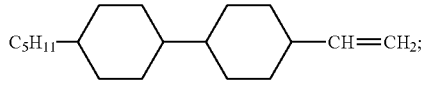

IV-1-14

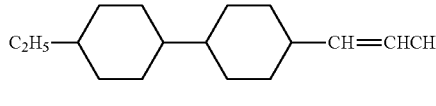

IV-1-15

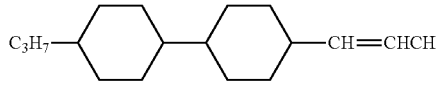

IV-1-16

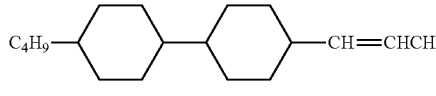

IV-1-17

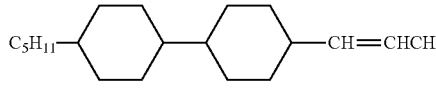

IV-1-18 the compounds of general formula IV-2 are selected from the group consisting of:

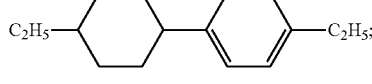

IV-2-1

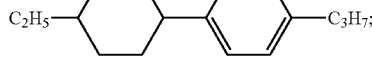

IV-2-2

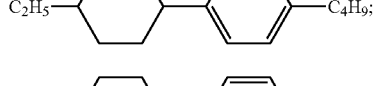

IV-2-3

IV-2-4

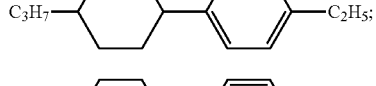

IV-2-5

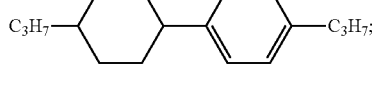

IV-2-6

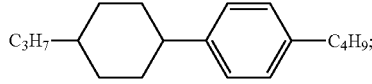

IV-2-7

-continued
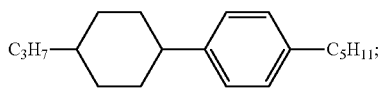
IV-2-8
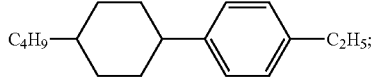
IV-2-9
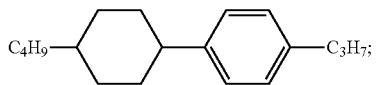
IV-2-10
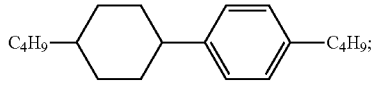
IV-2-11
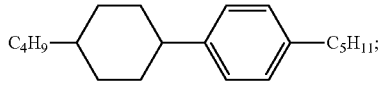
IV-2-12
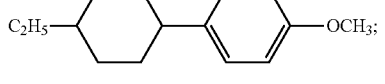
IV-2-13
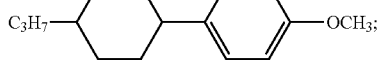
IV-2-14
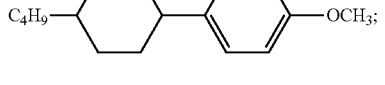
IV-2-15
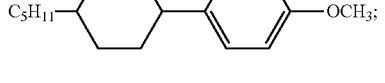
IV-2-16
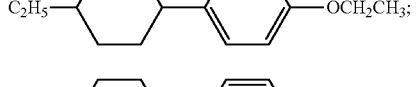
IV-2-17
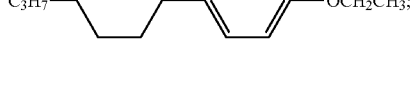
IV-2-18
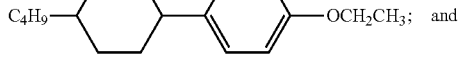 and
IV-2-19
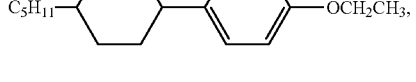
IV-2-20
the compounds of general formula IV-3 are selected from the group consisting of:
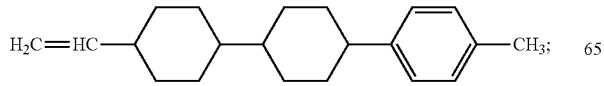
IV-3-1
-continued
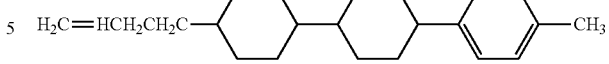
IV-3-2
IV-3-3
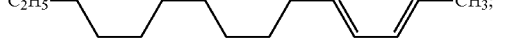
IV-3-4
IV-3-5
IV-3-6
IV-3-7
IV-3-8
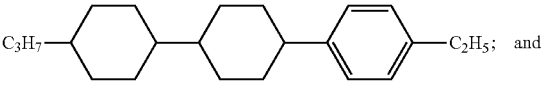 and
IV-3-9
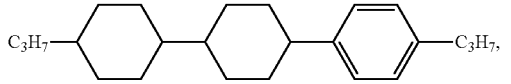
IV-3-10
the compounds of general formula IV-4 are selected from the group consisting of:
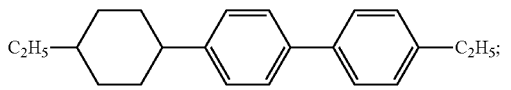
IV-4-1
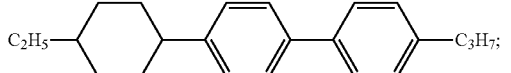
IV-4-2
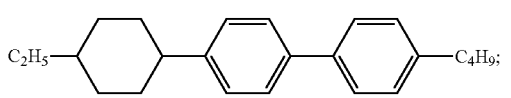
IV-4-3

-continued

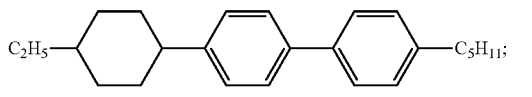
IV-4-4

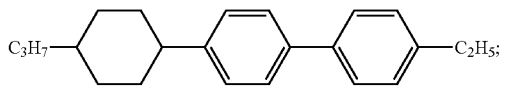
IV-4-5

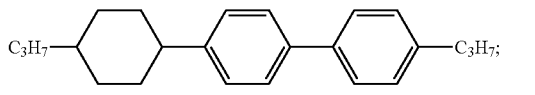
IV-4-6

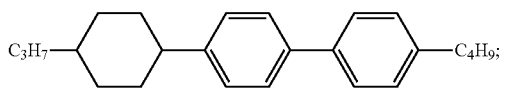
IV-4-7

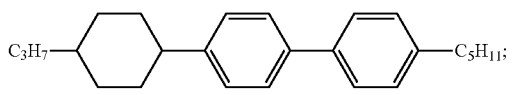
IV-4-8

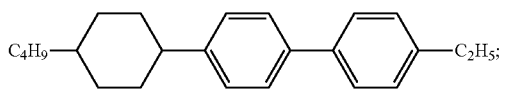
IV-4-9

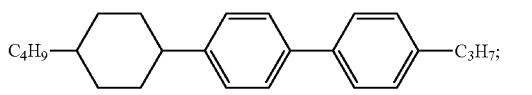
IV-4-10

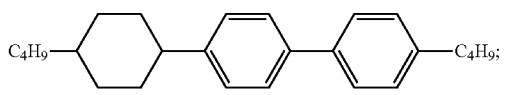
IV-4-11

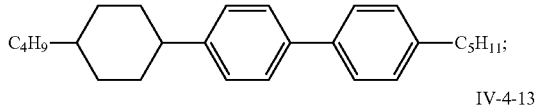
IV-4-12

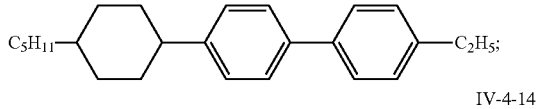
IV-4-13

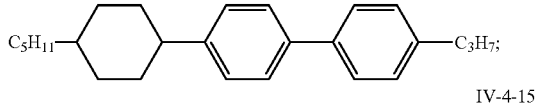
IV-4-14

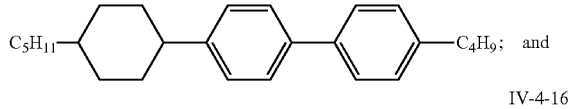
IV-4-15

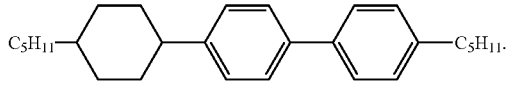
IV-4-16

12. The liquid crystal composition according to claim 1, wherein the compounds of general formula I account for 5-20% of the total weight of the liquid crystal composition; the compounds of general formula II account for 10-30% of the total weight of the liquid crystal composition; the compounds of general formula III account for 1-10% of the total weight of the liquid crystal composition; the compounds of general formula IV account for 45-75% of the total weight of the liquid crystal composition.

13. A liquid crystal display device, the device comprises the liquid crystal composition of claim 1.

14. The liquid crystal composition according to claim 2, wherein the compounds of general formula I account for 5-20% of the total weight of the liquid crystal composition; the compounds of general formula II account for 10-30% of the total weight of the liquid crystal composition; the compounds of general formula III account for 1-10% of the total weight of the liquid crystal composition; the compounds of general formula IV account for 45-75% of the total weight of the liquid crystal composition.

15. The liquid crystal composition according to claim 5, wherein the compounds of general formula I account for 5-20% of the total weight of the liquid crystal composition; the compounds of general formula II account for 10-30% of the total weight of the liquid crystal composition; the compounds of general formula III account for 1-10% of the total weight of the liquid crystal composition; the compounds of general formula IV account for 45-75% of the total weight of the liquid crystal composition.

16. The liquid crystal composition according to claim 6, wherein the compounds of general formula I account for 5-20% of the total weight of the liquid crystal composition; the compounds of general formula II account for 10-30% of the total weight of the liquid crystal composition; the compounds of general formula III account for 1-10% of the total weight of the liquid crystal composition; the compounds of general formula IV account for 45-75% of the total weight of the liquid crystal composition.

17. The liquid crystal composition according to claim 8, wherein the compounds of general formula I account for 5-20% of the total weight of the liquid crystal composition; the compounds of general formula II account for 10-30% of the total weight of the liquid crystal composition; the compounds of general formula III account for 1-10% of the total weight of the liquid crystal composition; the compounds of general formula IV account for 45-75% of the total weight of the liquid crystal composition.

18. The liquid crystal composition according to claim 10, wherein the compounds of general formula I account for 5-20% of the total weight of the liquid crystal composition; the compounds of general formula II account for 10-30% of the total weight of the liquid crystal composition; the compounds of general formula III account for 1-10% of the total weight of the liquid crystal composition; the compounds of general formula IV account for 45-75% of the total weight of the liquid crystal composition.

19. A liquid crystal display device, the device comprises the liquid crystal composition of claim 2.

20. A liquid crystal display device, the device comprises the liquid crystal composition of claim 12.

* * * * *